United States Patent
VanBuskirk et al.

(10) Patent No.: US 11,683,357 B2
(45) Date of Patent: *Jun. 20, 2023

(54) MANAGING AND DISTRIBUTING CONTENT IN A PLURALITY OF OBSERVATION PLATFORMS

(71) Applicant: Theatro Labs, Inc., Richardson, TX (US)

(72) Inventors: Guy R. VanBuskirk, Grapevine, TX (US); Ravi Shankar Kumar, Richardson, TX (US); Shiva Cheedella, Dallas, TX (US); Steve Lucy, Dallas, TX (US)

(73) Assignee: Theatro Labs, Inc., Richardson, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/698,325

(22) Filed: Mar. 18, 2022

(65) Prior Publication Data

US 2022/0210209 A1 Jun. 30, 2022

Related U.S. Application Data

(63) Continuation of application No. 17/026,535, filed on Sep. 21, 2020, now Pat. No. 11,283,848, which is a
(Continued)

(51) Int. Cl.
*H04L 65/611* (2022.01)
*H04W 4/029* (2018.01)
(Continued)

(52) U.S. Cl.
CPC ............ *H04L 65/611* (2022.05); *G06Q 10/00* (2013.01); *G06Q 30/00* (2013.01); *H04L 51/214* (2022.05);
(Continued)

(58) Field of Classification Search
CPC ...... H04L 65/611; H04L 51/214; H04L 67/63; G06Q 10/00; G06Q 30/00; H04W 4/02; H04W 4/029
See application file for complete search history.

(56) References Cited

U.S. PATENT DOCUMENTS 5,712,899 A   1/1998  Pace
6,301,573 B1  10/2001 McIlwaine et al.
(Continued)

FOREIGN PATENT DOCUMENTS

EP   2679041 B1   11/2018
WO   0210926 A1   2/2002

OTHER PUBLICATIONS

Supplementary European Search Report, Application No. 12748969.8, dated Dec. 15, 2016, 7 pages.
(Continued)

*Primary Examiner* — Austin J Moreau

(57) ABSTRACT

In a method for managing and distributing content in a plurality of observation platforms, a message is generated with employment related content at a cloud based component of a content distribution manager in response to user interaction via an interface of the content distribution manager presented on a computer system. Responsive to the user interactions and to interactions of third party software via an application program interface with the cloud based component, delivery of the message is scheduled and a plurality of specified devices belonging to a specified class of employees are specified for delivery in a plurality of observation platforms at a designated time and location via the cloud based component. The message is delivered and the delivery and response to the message are measured to the plurality of observation platforms which relay the message to the plurality of specified devices at the designated time and the designated location.

28 Claims, 17 Drawing Sheets

Related U.S. Application Data continuation of application No. 16/521,823, filed on Jul. 25, 2019, now Pat. No. 10,785,274, which is a continuation of application No. 14/586,797, filed on Dec. 30, 2014, now Pat. No. 10,375,133, which is a continuation-in-part of application No. 13/665,527, filed on Oct. 31, 2012, now abandoned, which is a continuation-in-part of application No. 13/401,146, filed on Feb. 21, 2012, now Pat. No. 8,948,730.

(60) Provisional application No. 61/487,432, filed on May 18, 2011, provisional application No. 61/445,504, filed on Feb. 22, 2011.

(51) Int. Cl.
*G06Q 10/00* (2023.01)
*G06Q 30/00* (2023.01)
*H04L 51/214* (2022.01)
*H04L 67/63* (2022.01)
*H04W 4/02* (2018.01)

(52) U.S. Cl.
CPC ............... *H04L 67/63* (2022.05); *H04W 4/02* (2013.01); *H04W 4/029* (2018.02)

(56) References Cited

U.S. PATENT DOCUMENTS

| | | |
|---|---|---|
| 6,377,927 B1 | 4/2002 | Loghmani et al. |
| 6,618,734 B1 | 9/2003 | Williams et al. |
| 6,928,343 B2 | 8/2005 | Cato |
| 6,937,988 B1 | 8/2005 | Hemkumar et al. |
| 6,937,998 B1 | 8/2005 | McGlynn et al. |
| 6,996,531 B2 | 2/2006 | Korall et al. |
| 7,058,208 B2 | 6/2006 | Chang et al. |
| 7,248,881 B2 | 7/2007 | Shostak |
| 7,397,368 B2 | 7/2008 | Otto et al. |
| 7,640,511 B1 | 12/2009 | Keel et al. |
| 7,656,295 B2 | 2/2010 | Robson et al. |
| 7,748,618 B2 | 7/2010 | Vawter |
| 7,925,777 B2 | 4/2011 | Levett |
| 8,055,296 B1* | 11/2011 | Persson ............. H04M 1/72457 455/457 |
| 8,060,412 B2 | 11/2011 | Rosenbaum et al. |
| 8,140,340 B2 | 3/2012 | Bhogal et al. |
| 8,170,036 B1 | 5/2012 | Gunasekara et al. |
| 8,174,359 B1 | 5/2012 | Veni |
| 8,179,872 B2 | 5/2012 | Bienfait et al. |
| 8,180,377 B2 | 5/2012 | Yang et al. |
| 8,183,996 B2 | 5/2012 | Toyokawa et al. |
| 8,200,480 B2 | 6/2012 | Shectman et al. |
| 8,233,943 B1 | 7/2012 | Othmer et al. |
| 8,271,188 B2 | 9/2012 | De Koning |
| 8,352,260 B2 | 1/2013 | Sung et al. |
| 8,369,505 B2 | 2/2013 | Vuong |
| 8,392,262 B2 | 3/2013 | Mallick et al. |
| 8,473,289 B2 | 6/2013 | Jitkoff et al. |
| 8,630,851 B1 | 1/2014 | Hertschuh et al. |
| 8,699,694 B2 | 4/2014 | Chishti et al. |
| 8,798,036 B2 | 8/2014 | Küt et al. |
| 8,948,730 B2 | 2/2015 | Vanbuskirk et al. |
| 9,042,921 B2 | 5/2015 | Karmarkar |
| 9,053,449 B2 | 6/2015 | Kumar et al. |
| 9,060,050 B1 | 6/2015 | Chau et al. |
| 9,195,959 B1 | 11/2015 | Lopez et al. |
| 9,271,118 B2 | 2/2016 | Vanbuskirk et al. |
| 9,305,554 B2 | 4/2016 | Jagatheesan et al. |
| 9,311,466 B2 | 4/2016 | Headley |
| 9,349,128 B1* | 5/2016 | Kerr ................... G06Q 30/0261 |
| 9,407,543 B2 | 8/2016 | Russell et al. |
| 9,414,195 B2 | 8/2016 | Russell et al. |
| 9,445,232 B2 | 9/2016 | Russell et al. |
| 9,501,951 B2 | 11/2016 | Russell |
| 9,514,656 B2 | 12/2016 | Russell |
| 9,542,695 B2 | 1/2017 | Russell |
| 9,602,625 B2 | 3/2017 | Russell et al. |
| 9,665,899 B1 | 5/2017 | Nair et al. |
| 9,686,732 B2 | 6/2017 | Russell et al. |
| 9,691,047 B2 | 6/2017 | Russell et al. |
| 9,721,285 B2 | 8/2017 | Jones et al. |
| 9,928,529 B2 | 3/2018 | Russell et al. |
| 9,971,983 B2 | 5/2018 | Russell et al. |
| 9,971,984 B2 | 5/2018 | Russell et al. |
| 10,069,781 B2 | 9/2018 | Kumar et al. |
| 10,134,001 B2 | 11/2018 | Todd et al. |
| 10,204,524 B2 | 2/2019 | Russell et al. |
| 10,257,085 B2 | 4/2019 | Russel et al. |
| 10,304,094 B2 | 5/2019 | Russell et al. |
| 10,313,289 B2 | 6/2019 | Kumar et al. |
| 10,375,133 B2 | 8/2019 | Vanbuskirk et al. |
| 10,558,938 B2 | 2/2020 | Todd et al. |
| 10,574,784 B2 | 2/2020 | Russell et al. |
| 10,699,313 B2 | 6/2020 | Russell et al. |
| 10,891,578 B2 | 1/2021 | Marinescu et al. |
| 11,037,184 B2 | 6/2021 | Li et al. |
| 11,038,982 B2 | 6/2021 | Russell et al. |
| 11,257,021 B2 | 2/2022 | Todd et al. |
| 11,283,848 B2 | 3/2022 | Vanbuskirk et al. |
| 11,410,104 B2 | 8/2022 | Todd et al. |
| 2002/0055866 A1 | 5/2002 | Dewar |
| 2002/0072984 A1 | 6/2002 | Rothman et al. |
| 2002/0136383 A1 | 9/2002 | Contreras |
| 2002/0143548 A1 | 10/2002 | Korall et al. |
| 2003/0065805 A1* | 4/2003 | Barnes, Jr. ......... G06Q 30/0643 709/244 |
| 2003/0120805 A1 | 6/2003 | Couts et al. |
| 2003/0130893 A1 | 7/2003 | Farmer |
| 2003/0236086 A1 | 12/2003 | Litwin |
| 2004/0203989 A1 | 10/2004 | Karaoguz |
| 2005/0021838 A1 | 1/2005 | Levett |
| 2005/0060236 A1 | 3/2005 | Iulo |
| 2005/0190772 A1 | 9/2005 | Tsai et al. |
| 2005/0213518 A1 | 9/2005 | Ahya et al. |
| 2005/0221264 A1 | 10/2005 | Hearn et al. |
| 2005/0245232 A1 | 11/2005 | Jakober et al. |
| 2006/0071775 A1 | 4/2006 | Otto et al. |
| 2006/0095317 A1 | 5/2006 | Brown et al. |
| 2006/0248011 A1 | 11/2006 | Hecht-Nielsen et al. |
| 2007/0046458 A1 | 3/2007 | Toyokawa et al. |
| 2007/0064913 A1 | 3/2007 | Shaffer et al. |
| 2007/0129061 A1 | 6/2007 | Ringland et al. |
| 2007/0207789 A1 | 9/2007 | Zellner et al. |
| 2007/0223662 A1 | 9/2007 | Jain et al. |
| 2008/0040431 A1 | 2/2008 | Bleeker et al. |
| 2008/0041937 A1 | 2/2008 | Vawter |
| 2008/0154612 A1 | 6/2008 | Evermann et al. |
| 2008/0159271 A1 | 7/2008 | Kutt et al. |
| 2008/0240384 A1 | 10/2008 | Suryanarayana et al. |
| 2008/0242319 A1 | 10/2008 | Paschetto et al. |
| 2008/0270249 A1 | 10/2008 | Rosenbaum et al. |
| 2008/0279133 A1 | 11/2008 | Bienfait et al. |
| 2009/0003309 A1 | 1/2009 | Bawcutt et al. |
| 2009/0005972 A1 | 1/2009 | De Koning |
| 2009/0012793 A1 | 1/2009 | Dao et al. |
| 2009/0176510 A1 | 7/2009 | Routtenberg |
| 2009/0234655 A1 | 9/2009 | Kwon |
| 2009/0249432 A1 | 10/2009 | O'Sullivan et al. |
| 2009/0254667 A1 | 10/2009 | Li et al. |
| 2010/0003659 A1 | 1/2010 | Edmonds |
| 2010/0009698 A1 | 1/2010 | Yang et al. |
| 2010/0054526 A1 | 3/2010 | Eckles |
| 2010/0070268 A1 | 3/2010 | Sung et al. |
| 2010/0088749 A1 | 4/2010 | Steeples |
| 2010/0094707 A1 | 4/2010 | Freer |
| 2010/0113062 A1 | 5/2010 | Lee et al. |
| 2010/0266994 A1 | 10/2010 | Gregoire et al. |
| 2010/0325207 A1 | 12/2010 | Churchill et al. |
| 2011/0022642 A1 | 1/2011 | Demilo et al. |
| 2011/0055207 A1 | 3/2011 | Schorzman et al. |
| 2011/0072154 A1 | 3/2011 | Bogdanovic et al. |
| 2011/0077989 A1 | 3/2011 | Akred et al. |
| 2011/0093818 A1 | 4/2011 | Sathish |
| 2011/0171935 A1 | 7/2011 | Kamal |

(56) References Cited

U.S. PATENT DOCUMENTS

| | | |
|---|---|---|
| 2011/0173041 A1 | 7/2011 | Breitenbach et al. |
| 2011/0179180 A1 | 7/2011 | Schleifer et al. |
| 2011/0201356 A1 | 8/2011 | George et al. |
| 2011/0202466 A1 | 8/2011 | Carter |
| 2011/0205053 A1 | 8/2011 | Chen et al. |
| 2011/0237217 A1 | 9/2011 | Monks et al. |
| 2011/0255680 A1 | 10/2011 | Vuong |
| 2012/0034590 A1 | 2/2012 | Hallsten et al. |
| 2012/0071129 A1 | 3/2012 | Haney |
| 2012/0089617 A1 | 4/2012 | Frey |
| 2012/0123890 A1* | 5/2012 | Nathan .............. G06Q 90/20 705/26.1 |
| 2012/0151380 A1 | 6/2012 | Bishop |
| 2012/0226757 A1* | 9/2012 | McFarland .......... H04W 4/023 709/206 |
| 2012/0258437 A1 | 10/2012 | Sadeh-Koniecpol et al. |
| 2012/0310980 A1 | 12/2012 | Hepper |
| 2013/0040600 A1 | 2/2013 | Reitnour et al. |
| 2013/0060568 A1 | 3/2013 | Russell et al. |
| 2013/0073388 A1 | 3/2013 | Heath |
| 2013/0117824 A1 | 5/2013 | Naslund et al. |
| 2013/0130207 A1 | 5/2013 | Russell et al. |
| 2013/0196706 A1 | 8/2013 | Patel et al. |
| 2013/0196906 A1 | 8/2013 | Eliasof |
| 2013/0204972 A1 | 8/2013 | Russell et al. |
| 2013/0204998 A1 | 8/2013 | Russell et al. |
| 2013/0317944 A1 | 11/2013 | Huang et al. |
| 2014/0026094 A1 | 1/2014 | Zimmerman et al. |
| 2014/0052676 A1 | 2/2014 | Wagner et al. |
| 2014/0143354 A1 | 5/2014 | Tiernan |
| 2014/0148210 A1 | 5/2014 | Kundu et al. |
| 2014/0214979 A1 | 7/2014 | Turakhia |
| 2014/0279238 A1 | 9/2014 | Jones et al. |
| 2014/0316779 A1 | 10/2014 | Russell et al. |
| 2014/0316898 A1 | 10/2014 | Russell et al. |
| 2015/0065149 A1 | 3/2015 | Russell et al. |
| 2015/0100433 A1 | 4/2015 | Choy et al. |
| 2015/0105061 A1 | 4/2015 | Russell et al. |
| 2015/0106167 A1 | 4/2015 | Russell et al. |
| 2015/0113098 A1 | 4/2015 | Vanbuskirk et al. |
| 2015/0213382 A1 | 7/2015 | Russell et al. |
| 2015/0256873 A1 | 9/2015 | Klein et al. |
| 2015/0269700 A1 | 9/2015 | Miasnik et al. |
| 2015/0269869 A1 | 9/2015 | Russell et al. |
| 2015/0310536 A1 | 10/2015 | Brady et al. |
| 2016/0012471 A1 | 1/2016 | Fisher et al. |
| 2016/0014583 A1 | 1/2016 | Thomaschima et al. |
| 2016/0148300 A1 | 5/2016 | Carr et al. |
| 2016/0171432 A1 | 6/2016 | Pugh et al. |
| 2016/0225045 A1 | 8/2016 | Cumberland et al. |
| 2016/0321595 A1 | 11/2016 | Russell et al. |
| 2016/0321596 A1 | 11/2016 | Russell et al. |
| 2016/0321611 A1 | 11/2016 | Russell et al. |
| 2016/0323181 A1 | 11/2016 | Russell et al. |
| 2016/0364790 A1 | 12/2016 | Lanpher et al. |
| 2017/0011449 A1 | 1/2017 | Mueller et al. |
| 2017/0024804 A1 | 1/2017 | Tepfenhart et al. |
| 2017/0039512 A1 | 2/2017 | Jones et al. |
| 2017/0083848 A1 | 3/2017 | Edelman et al. |
| 2017/0091837 A1 | 3/2017 | Russell et al. |
| 2017/0093952 A1 | 3/2017 | Kumar et al. |
| 2017/0187826 A1 | 6/2017 | Russell et al. |
| 2017/0213178 A1 | 7/2017 | Todd et al. |
| 2018/0013698 A1 | 1/2018 | Vendrow et al. |
| 2018/0144356 A1 | 5/2018 | Holman et al. |
| 2018/0189844 A1 | 7/2018 | Russell et al. |
| 2018/0191817 A1 | 7/2018 | Richardson et al. |
| 2018/0260758 A1 | 9/2018 | Russell et al. |
| 2018/0375810 A1 | 12/2018 | Kumar et al. |
| 2019/0130336 A1 | 5/2019 | Todd et al. |
| 2019/0156688 A1 | 5/2019 | Russell et al. |
| 2019/0207894 A1 | 7/2019 | Kumar et al. |
| 2019/0311409 A1 | 10/2019 | Russell et al. |
| 2019/0349412 A1 | 11/2019 | Vanbuskirk et al. |
| 2020/0153729 A1 | 5/2020 | Vanbuskirk et al. |
| 2020/0175454 A1 | 6/2020 | Todd et al. |
| 2020/0195750 A1 | 6/2020 | Russell et al. |
| 2020/0210927 A1 | 7/2020 | Russell et al. |
| 2020/0302493 A1 | 9/2020 | Russell et al. |
| 2021/0006610 A1 | 1/2021 | Vanbuskirk et al. |
| 2021/0289042 A1 | 9/2021 | Vanbuskirk et al. |
| 2021/0334730 A1 | 10/2021 | Todd et al. |
| 2021/0334731 A1 | 10/2021 | Todd et al. |
| 2021/0334732 A1 | 10/2021 | Vanbuskirk et al. |
| 2021/0399981 A1 | 12/2021 | Vanbuskirk et al. |
| 2022/0108259 A1 | 4/2022 | Vanbuskirk et al. |
| 2022/0374949 A1 | 11/2022 | Russell et al. |

OTHER PUBLICATIONS

"European Search Report, Application No. 14160323.3", dated Jun. 18, 2014, 6 pages.

"International Search Report, PCT/2012/025984", dated Dec. 22, 2012, 9 pages.

"What is Cloud Networking or Cloud Based Networking?", SDxCentral, www.sdxcentral.com/cloud/definitions/all-about-cloud-networking/, 2017, 2 pgs.

Arbanowski, "I-centric Communications: Personalization, Ambient Awareness and Adaptability for Future Mobile Services", IEEE Communications Magazine, Sep. 2004, 7 pages.

Rao, "Geographic Routing without Location Information", 9th Annual International Conference on Mobile Computing and Networking, Sep. 2003, 13 pages.

* cited by examiner

Process
400

A SIGNAL FROM A FIRST COMMUNICATION DEVICE IS RECEIVED AT A SECOND COMMUNICATION DEVICE, WHEREIN A FIRST CHARACTERISTIC OF THE SIGNAL CORRESPONDS TO A VOICE OF A FIRST USER AND A SECOND CHARACTERISTIC OF THE SIGNAL CORRESPONDS TO INFORMATION INDICATIVE OF A GEOGRAPHIC POSITION OF THE FIRST COMMUNICATION DEVICE
402

THE FIRST USER ASSOCIATED WITH THE FIRST COMMUNICATION DEVICE IS RECOGNIZED
404

TEXT RELATED TO THE VOICE OF THE FIRST USER IS RECOGNIZED
406

CONTEXT INFORMATION FROM THE TEXT IS DERIVED AT A COMPUTER SYSTEM ASSOCIATED WITH THE SECOND COMMUNICATION DEVICE, WHEREIN THE CONTEXT INFORMATION CORRESPONDS TO A COMMAND RELATED TO THE TEXT
408

THE TEXT IS STORED IN A STORAGE MEDIUM FOR DEVELOPING KEY PERFORMANCE METRICS
410

THE SIGNAL IS RELAYED TO A DESTINATION DERIVED FROM THE CONTEXT INFORMATION
412

Fig. 4

Process
500

A FIRST USER ASSOCIATED WITH A FIRST COMMUNICATION DEVICE AND A SECOND USER ASSOCIATED WITH A SECOND COMMUNICATION DEVICE ARE RECOGNIZED AT A CENTRAL COMPUTER SYSTEM
502

GEOGRAPHIC LOCATIONS OF THE FIRST COMMUNICATION DEVICE AND THE SECOND COMMUNICATION DEVICE ARE TRACKED AT THE CENTRAL COMPUTER SYSTEM
504

A COMMUNICATION BETWEEN THE FIRST COMMUNICATION DEVICE AND THE SECOND COMMUNICATION DEVICE ARE TRACKED AND RECORDED AT THE CENTRAL COMPUTER SYSTEM, WHEREIN AT LEAST A PORTION OF THE COMMUNICATION IS AN AUDIBLE COMMUNICATION
506

FEATURES OF THE COMMUNICATION ARE IDENTIFIED AT THE CENTRAL COMPUTER SYSTEM
508

THE FEATURES ARE MADE AVAILABLE
510

Fig. 5

Process
600

A GROUP OF USERS IS RECOGNIZED, AT A COMPUTER SYSTEM, WHEREIN EACH USER OF THE GROUP OF USERS ARE ASSOCIATED WITH COMMUNICATION DEVICES
602

A COMMUNICATION BETWEEN THE COMMUNICATION DEVICES IS RECORDED AT THE COMPUTER SYSTEM, WHEREIN AT LEAST A PORTION OF THE COMMUNICATION IS AN AUDIBLE COMMUNICATION
604

GEOGRAPHIC LOCATIONS OF THE COMMUNICATION DEVICES ARE RECORDED AT THE COMPUTER SYSTEM
606

FEATURES ARE IDENTIFIED BASED UPON THE COMMUNICATION
608

A VISUAL REPRESENTATION OF THE FEATURES IS GENERATED AT THE COMPUTER SYSTEM
610

THE VISUAL REPRESENTATION IS MADE AVAILABLE TO A MANAGER FOR MAKING A DECISION
612

Fig. 6

Process
700

A SIGNAL IN A FIRST OBSERVATION PLATFORM IS RECEIVED FROM A FIRST COMMUNICATION DEVICE AT A SECOND COMMUNICATION DEVICE ASSOCIATED WITH A COMPUTER SYSTEM WHEREIN A FIRST CHARACTERISTIC OF THE SIGNAL CORRESPONDS TO AN AUDIBLE SOURCE AND A SECOND CHARACTERISTIC OF THE SIGNAL CORRESPONDS TO INFORMATION INDICATIVE OF A GEOGRAPHIC POSITION OF THE FIRST COMMUNICATION DEVICE, AND WHEREIN THE SECOND OBSERVATION PLATFORM IS ASSOCIATED WITH A RADIO RANGE
702

A FIRST USER ASSOCIATED WITH THE FIRST COMMUNICATION DEVICE IS RECOGNIZED AT THE COMPUTER SYSTEM
704

CONTEXT INFORMATION FOR THE SIGNAL IS DERIVED THE COMPUTER SYSTEM ASSOCIATED WITH THE SECOND COMMUNICATION DEVICE
706

THE SIGNAL IS RELAYED FROM THE COMPUTER SYSTEM TO A SECOND COMPUTER SYSTEM ASSOCIATED WITH A SECOND OBSERVATION PLATFORM
708

THE SIGNAL IS RELAYED TO A DESTINATION IN THE SECOND OBSERVATION PLATFORM VIA THE SECOND COMPUTER SYSTEM DERIVED FROM THE CONTEXT INFORMATION
710

Fig. 7

Process
800

A SIGNAL IS RECEIVED FROM A FIRST COMMUNICATION DEVICE AT A SECOND COMMUNICATION DEVICE ASSOCIATED WITH A COMPUTER SYSTEM, WHEREIN THE COMPUTER SYSTEM IS ASSOCIATED WITH AN ORGANIZATION, WHEREIN A FIRST CHARACTERISTIC OF THE SIGNAL CORRESPONDS TO AN AUDIBLE SOURCE AND A SECOND CHARACTERISTIC OF THE SIGNAL CORRESPONDS TO INFORMATION INDICATIVE OF A GEOGRAPHIC POSITION OF THE FIRST COMMUNICATION DEVICE.
802

A USER IS IDENTIFIED AS ASSOCIATED WITH THE FIRST COMMUNICATION DEVICE AT THE COMPUTER SYSTEM.
804

THE AUDIBLE SOURCE OF THE SIGNAL IS CONVERTED TO TEXT AT THE COMPUTER SYSTEM.
806

A QUERY RELATED TO THE ORGANIZATION IS DERIVED BASED ON THE TEXT AT THE COMPUTER SYSTEM.
808

A RESPONSE TO THE QUERY IS COMPILED AT THE COMPUTER SYSTEM, WHEREIN THE RESPONSE REPRESENTS THE ORGANIZATION.
810

THE RESPONSE IS SENT TO THE FIRST COMMUNICATION DEVICE, WHEREIN THE RESPONSE IS AUDIBLE AT THE FIRST COMMUNICATION DEVICE.
812

A PRIOR USER HISTORY OF THE USER IS ASSOCIATED WITH THE FIRST COMMUNICATION DEVICE.
814

THE SIGNAL AND THE RESPONSE ARE RELAYED TO A THIRD COMMUNICATION DEVICE ASSOCIATED WITH A PERSON REPRESENTING THE ORGANIZATION.
816

A SECOND RESPONSE IS RECEIVED AT THE SECOND COMMUNICATION DEVICE FROM THE THIRD COMMUNICATION DEVICE.
818

THE SECOND RESPONSE IS RELAYED TO THE FIRST COMMUNICATION DEVICE.
820

Fig. 8

Process
1100

A SIGNAL IS RECEIVED FROM A FIRST COMMUNICATION DEVICE AT A SECOND COMMUNICATION DEVICE ASSOCIATED WITH A COMPUTER SYSTEM, WHEREIN THE COMPUTER SYSTEM IS ASSOCIATED WITH A ORGANIZATION, WHEREIN A FIRST CHARACTERISTIC OF THE SIGNAL CORRESPONDS TO INFORMATION INDICATIVE OF A GEOGRAPHIC POSITION OF THE FIRST COMMUNICATION DEVICE.
1102

↓

A USER IS IDENTIFIED AS ASSOCIATED WITH THE FIRST COMMUNICATION DEVICE AT THE COMPUTER SYSTEM.
1104

↓

A HISTORY OF ACTIVITIES OF THE USER ASSOCIATED WITH THE ORGANIZATION IS ACCESSED.
1106

↓

A GEOGRAPHIC LOCATION OF THE FIRST COMMUNICATION DEVICE IN THE ORGANIZATION IS DERIVED AT THE COMPUTER SYSTEM.
1108

↓

A NOTIFICATION IS SENT TO THE FIRST COMMUNICATION DEVICE WHEREIN THE NOTIFICATION IS BASED ON THE HISTORY OF ACTIVITY AND THE GEOGRAPHIC LOCATION OF THE FIRST COMMUNICATION DEVICE.
1110

↓

AT LEAST A PORTION OF THE HISTORY OF ACTIVITIES IS DELIVERED TO THE FIRST COMMUNICATION DEVICE.
1112

Fig. 11

Process
1200

A SIGNAL IS RECEIVED FROM A FIRST COMMUNICATION DEVICE AT A SECOND COMMUNICATION DEVICE ASSOCIATED WITH A COMPUTER SYSTEM, WHEREIN THE SIGNAL COMPRISES A MANDATORY MESSAGE FOR A THIRD COMMUNICATION DEVICE.
1202

THE SIGNAL IS FORWARDED WITH THE MANDATORY MESSAGE TO THE THIRD COMMUNICATION DEVICE ASSOCIATED WITH A USER SUCH THAT A RECEIPT OF THE MANDATORY MESSAGE AT THE THIRD COMMUNICATION DEVICE WILL LOCK FEATURES OF THE THIRD COMMUNICATION DEVICE UNTIL THE MANDATORY MESSAGE HAS BEEN ACKNOWLEDGED BY THE USER.
1204

AN ACKNOWLEDGEMENT OF THE MANDATORY MESSAGE IS RECEIVED FROM THE THIRD COMMUNICATION DEVICE AT THE SECOND COMMUNICATION DEVICE.
1206

THE ACKNOWLEDGEMENT OF THE MANDATORY MESSAGE IS FORWARDED FROM THE SECOND COMMUNICATION DEVICE TO THE FIRST COMMUNICATION DEVICE.
1208

THE SIGNAL WITH THE MANDATORY MESSAGE IS FORWARDED TO A PLURALITY OF COMMUNICATION DEVICES ASSOCIATED WITH A PLURALITY OF USERS SUCH THAT A RECEIPT OF THE MANDATORY MESSAGE AT EACH OF THE PLURALITY OF COMMUNICATION DEVICES WILL LOCK FEATURES OF EACH OF THE PLURALITY OF COMMUNICATION DEVICES UNTIL THE MANDATORY MESSAGE HAS BEEN ACKNOWLEDGED BY EACH OF THE PLURALITY OF USERS.
1210

A CHARACTERISTIC OF THE FORWARDING THE SIGNAL WITH THE MANDATORY MESSAGE IS TRACKED.
1212

Fig. 12

Process
1400

A MESSAGE IS GENERATED WITH CONTENT AT A CONTENT DISTRIBUTION MANAGER.
1402

A DELIVERY OF THE MESSAGE IS SCHEDULED AND A PLURALITY OF SPECIFIED DEVICES ARE SPECIFIED FOR DELIVERY IN A PLURALITY OF OBSERVATION PLATFORMS AT A DESIGNATED TIME VIA THE CONTENT DISTRIBUTION MANAGER, WHEREIN THE PLURALITY OF OBSERVATION PLATFORMS ARE CAPABLE OF RECEIVING A SIGNAL FROM A FIRST MOBILE DEVICE WITH A FIRST CHARACTERISTIC THAT CORRESPONDS TO AN AUDIBLE SOURCE AND A SECOND CHARACTERISTIC THAT CORRESPONDS TO INFORMATION INDICATIVE OF A GEOGRAPHIC POSITION OF THE FIRST MOBILE DEVICE AND RELAYING THE SIGNAL TO A DESTINATION BASED ON THE FIRST CHARACTERISTIC AND/OR THE SECOND CHARACTERISTIC.
1404

THE MESSAGE IS DELIVERED TO THE PLURALITY OF OBSERVATION PLATFORMS WHICH RELAYS THE MESSAGE TO THE PLURALITY OF SPECIFIED DEVICES AT THE DESIGNATED TIME.
1406

A CONFIRMATION IS RECEIVED AT THE CONTENT DISTRIBUTION MANAGER THAT THE MESSAGE HAS BEEN DELIVERED TO ONE OF THE PLURALITY OF SPECIFIED DEVICES.
1408

A CONFIRMATION IS RECEIVED AT THE CONTENT DISTRIBUTION MANAGER THAT THE MESSAGE HAS BEEN PLAYED AT ONE OF THE PLURALITY OF SPECIFIED DEVICES.
1410

Fig. 14

Process
1500

ONE OBSERVATION PLATFORM OF A PLURALITY OF OBSERVATION PLATFORMS IS ACCESSED VIA A MANAGER APPLICATION AT A MOBILE DEVICE COMPRISING A PROCESSOR, MEMORY, AND A NETWORK INTERFACE CARD, WHEREIN THE PLURALITY OF OBSERVATION PLATFORMS ARE CAPABLE OF RECEIVING A SIGNAL FROM A FIRST MOBILE DEVICE WITH A FIRST CHARACTERISTIC THAT CORRESPONDS TO AN AUDIBLE SOURCE AND A SECOND CHARACTERISTIC THAT CORRESPONDS TO INFORMATION INDICATIVE OF A GEOGRAPHIC POSITION OF THE FIRST MOBILE DEVICE AND RELAYING THE SIGNAL TO A DESTINATION BASED ON THE FIRST CHARACTERISTIC AND/OR THE SECOND CHARACTERISTIC.
1502

MONITORING STATISTICS ARE DISPLAYED OF THE ONE OBSERVATION PLATFORM CORRESPONDING TO DEVICES ASSOCIATED WITH THE OBSERVATION PLATFORM.
1504

A MESSAGE IS RECEIVED AT THE MANAGER APPLICATION FROM A USER OF THE MOBILE DEVICE.
1506

THE MESSAGE IS RELAYED TO SPECIFIED DEVICES IN THE ONE OBSERVATION PLATFORM FROM THE MANAGER APPLICATION, WHEREIN THE SPECIFIED DEVICES ARE SPECIFIED BY THE USER VIA THE MOBILE DEVICE AND THE MANAGER APPLICATION.
1508

A CONFIRMATION IS RECEIVED AT THE MANAGER APPLICATION THAT THE MESSAGE HAS BEEN DELIVERED TO AT LEAST ONE OF THE SPECIFIED DEVICES.
1510

Fig. 15

MANAGING AND DISTRIBUTING CONTENT IN A PLURALITY OF OBSERVATION PLATFORMS

RELATED APPLICATIONS

This application is a continuation of and claims the benefit of co-pending U.S. patent application Ser. No. 17/026,535 (now U.S. Pat. No. 11,283,848), filed on Sep. 21, 2020, entitled "ANALYSIS OF CONTENT DISTRIBUTION USING AN OBSERVATION PLATFORM," by VanBuskirk, et al., assigned to the assignee of the present application, which is incorporated in its entirety by reference.

The application with Ser. No. 17/026,535 is a continuation of and claims the benefit of then co-pending U.S. patent application Ser. No. 16/521,823 (now U.S. Pat. No. 10,785,274), filed on Jul. 25, 2019, entitled "ANALYSIS OF CONTENT DISTRIBUTION USING AN OBSERVATION PLATFORM," by VanBuskirk, et al., assigned to the assignee of the present application, which is incorporated in its entirety by reference.

The application with Ser. No. 16/521,823 is a continuation of and claims the benefit of then co-pending U.S. patent application Ser. No. 14/586,797 (now U.S. Pat. No. 10,375,133), filed on Dec. 30, 2014, entitled "CONTENT DISTRIBUTION AND DATA AGGREGATION FOR SCALABILITY OF OBSERVATION PLATFORMS," by VanBuskirk, et al., assigned to the assignee of the present application, which is incorporated in its entirety by reference.

The application with Ser. No. 14/586,797 is a continuation-in-part application of and claims the benefit of then U.S. patent application Ser. No. 13/665,527, filed on Oct. 31, 2012, entitled "AUDIBLE COMMUNICATIONS FOR QUERIES WITH INFORMATION INDICATIVE OF GEOGRAPHIC POSITION," by Russell, et al., now Abandoned, assigned to the assignee of the present application, which is incorporated in its entirety by reference.

The application with Ser. No. 13/665,527 is a continuation-in-part application of and claims the benefit of U.S. patent application Ser. No. 13/401,146, filed on Feb. 21, 2012, entitled "OBSERVATION PLATFORM FOR USING STRUCTURED COMMUNICATIONS," by Russell, et al., now U.S. Pat. No. 8,948,730, assigned to the assignee of the present application. The application with Ser. No. 13/665,527 incorporated the patent application Ser. No. 13/401,146 by reference in its entirety.

The application with Ser. No. 13/401,146 claims priority to the provisional U.S. Patent Application No. 61/445,504, filed on Feb. 22, 2011, entitled "ENABLING A RETAIL SALES/SERVICE PROVIDER TO INTERACT WITH ON-PREMISE CUSTOMERS," by Russell, et al. The application with Ser. No. 13/401,146 also claims priority to the provisional U.S. Patent Application No. 61/487,432, Filed on May 18, 2011, entitled "ACTIVITY COORDINATING ASSOCIATE'S AUTOMATIC SERVICE ASSISTANT," by Russell, et al. The application with Ser. No. 13/401,146 incorporated the Provisional Patent Applications 61/445,504 and 61/487,432 in their entirety by reference.

BACKGROUND

Retailers are under constant pressure to cut costs, improve margins, and increase floor traffic and customer satisfaction. This has always been so, but the rise of the internet, available at home and while mobile, has increased the pressure greatly. Loyalty programs and per-customer pricing, such as special discounts, are one set of tools used in the past, and used more. Moreover, there is an increased demand to manage and train associates and provide an increased measure of customer satisfaction in a retail environment. Such concerns also extend to situations and environments besides retail settings. Modern communication devices provide for many communication and business analytics opportunities in retail and other settings.

BRIEF DESCRIPTION OF THE DRAWINGS

FIG. 4 illustrates a flowchart of an example method for disciplining communications in accordance with embodiments of the present technology.

FIG. 5 illustrates a flowchart of an example method for observing and recording users of communication devices in accordance with embodiments of the present technology.

FIG. 6 illustrates a flowchart of an example method for characterizing communications in a group of users in accordance with embodiments of the present technology.

FIG. 7 illustrates a flowchart of an example method for structuring communication in a plurality of observation platforms in accordance with embodiments of the present technology.

FIG. 8 illustrates a flowchart of an example method for performing communications in an of observation platforms in accordance with embodiments of the present technology.

FIG. 11 illustrates a flowchart of an example method for performing communications in an of observation platforms in accordance with embodiments of the present technology.

FIG. 12 illustrates a flowchart of an example method for performing communications in an of observation platforms in accordance with embodiments of the present technology.

FIG. 14 illustrates a flowchart of an example method for managing and distributing content and aggregation of data in a plurality of observation platforms in accordance with embodiments of the present technology.

FIG. 15 illustrates a flowchart of an example method for managing a plurality of observation platforms via a manager application in accordance with embodiments of the present technology.

Figure 1A:
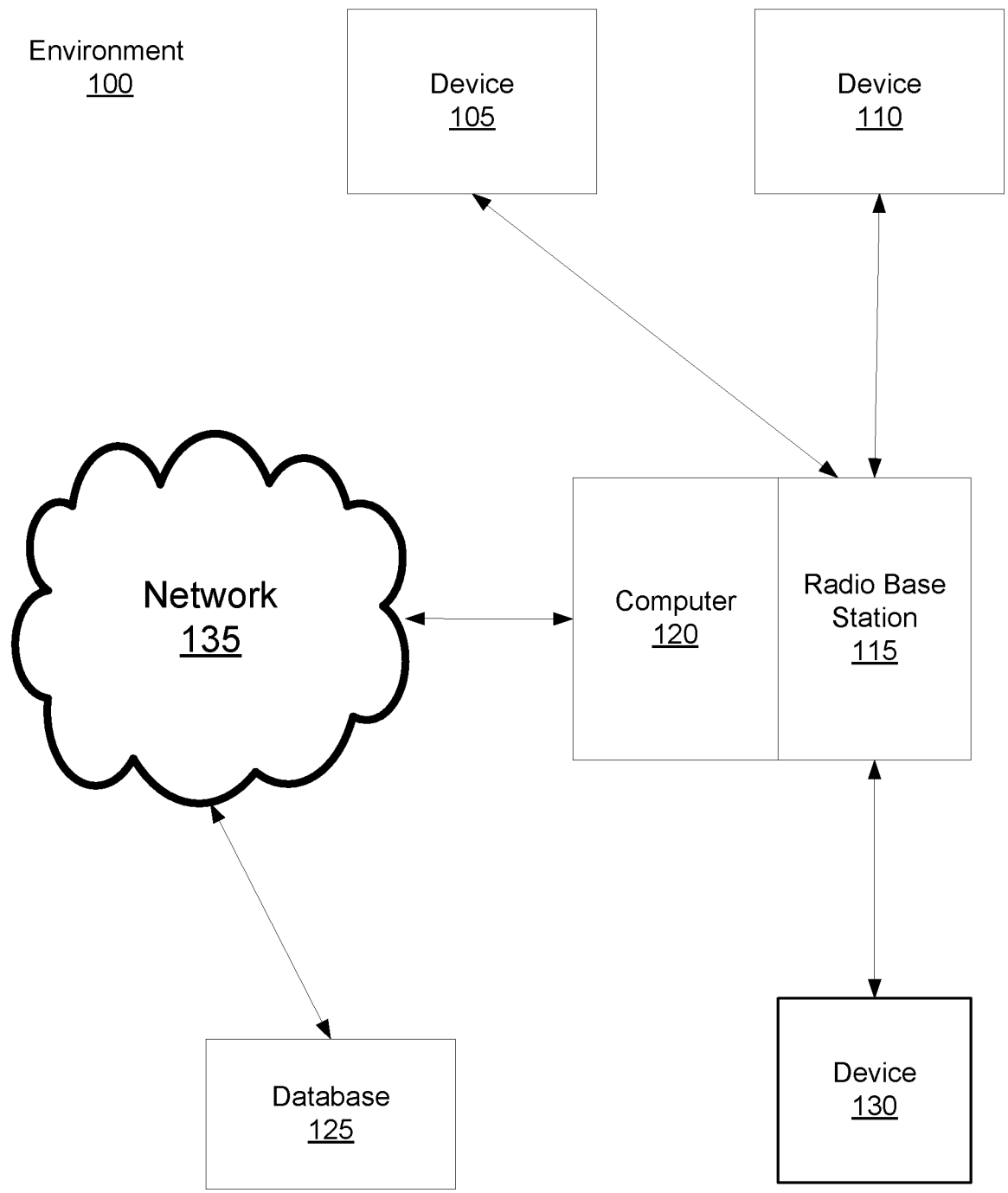
FIG. 1A illustrates a block diagram of an example environment for an observation platform for structuring a communication in accordance with embodiments of the present technology.

The drawings referred to in this description of embodiments should be understood as not being drawn to scale except if specifically noted.

DESCRIPTION OF EMBODIMENTS

Reference will now be made in detail to embodiments of the present technology, examples of which are illustrated in the accompanying drawings. While the technology will be described in conjunction with various embodiment(s), it will be understood that they are not intended to limit the present technology to these embodiments. On the contrary, the present technology is intended to cover alternatives, modifications and equivalents, which may be included within the spirit and scope of the various embodiments as defined by the appended claims.

Furthermore, in the following description of embodiments, numerous specific details are set forth in order to provide a thorough understanding of the present technology. However, the present technology may be practiced without these specific details. In other instances, well known methods, procedures, components, and circuits have not been described in detail as not to unnecessarily obscure aspects of the present embodiments.

Unless specifically stated otherwise as apparent from the following discussions, it is appreciated that throughout the present description of embodiments, discussions utilizing terms such as "receiving," "recognizing," "deriving," "storing," "relaying," "executing," "generating," "determining," "tracking," "recording," "identifying," "making," "delivering," "scheduling," "specifying," or the like, refer to the actions and processes of a computer system, or similar electronic computing device. The computer system or similar electronic computing device, such as a telephone, smart phone, tablet computer, or handheld mobile device, manipulates and transforms data represented as physical (electronic) quantities within the computer system's registers and memories into other data similarly represented as physical quantities within the computer system memories or registers or other such information storage, transmission, or display devices. Embodiments of the present technology are also well suited to the use of other computer systems such as, for example, optical and mechanical computers.

Overview of Content Distribution and Data Aggregation for Scalability of Observation Platforms Embodiments of the present technology are for a content distribution manager for scalability of observation platforms. An observation platform may involve a number of users or people and provides structure and discipline communications for the users and captures data regarding the communications such as user context and performance metrics. The present technology may be employed in various environments such as retail settings, public-stage floors, outdoor venues, concerts, police scenarios, disaster areas, schools, sporting events, hospitality operations, security operations, military operations, a prison organization, customer service, manufacturing organization, a factory, and other environments where humans work together and where communications occur between users.

The content distribution and data aggregation system, hereinafter called "the content distribution manager," allows for simple operation of a plurality of observation platforms by providing a graphical and audio interface for choosing individuals or groups of individuals for which to send or receive messages and collect, group, aggregate and statistically analyze connections, motions or behaviors of users within and between a set of observation platforms.

The present technology employs an architecture with cloud based services that allows for the management of a plurality of observation platforms. For example, a manager may be responsible for any number of retail and/or hospitality environments such as a hundreds or even thousands of retail environment each with their own physical building and each with an observation platform. Each environment may comprise any number of users associated with the observation platform including managers, store associates, employees, hourly workers, salespeople, customers, guests, etc. The manager may employ the present technology to observe the observation platforms or may use the present technology to hear, see or deliver messages to the devices associated with the observation platforms. The messages may be a voice recording or other type of audio file possibly generated by text-to-speech (TTS) engines attached to or contained within the present technology. The manager or user may employ a content distribution manager to generate or access the message. The content distribution manager is then used to schedule when the message is to be delivered to the devices. The content distribution manager may also be used to determine or specify which devices in the observation platforms are to receive the message. For example, the content distribution manager may be used to specify that the message is only to be delivered to devices that are associated with the store manager(s) or may specify that all devices associated with a particular department are to receive the message. The specification of devices to receive the information may also be based on the context of the devices as determined by one or more of: the identity of the user (if identified) associated with the device, the characteristics of the signals being received by the device, the history of the signals that have been received by the device or associated user and the analysis of the historical metrics of the device or user associated with the device. In one embodiment, different devices may be scheduled to receive the message at different times.

In one embodiment, the content distribution manager may be accessed by any computing device via a uniform resource locator (URL) or web address. The content distribution manager has a graphical interface for the user or manager to observe the observation platforms and to control the content and messages sent by the content distribution manager to the devices associated with the observation platforms. Portions or components of the content distribution manager may be executed or associated with cloud services or cloud computing. The cloud services are then used to deliver the messages with content to the observation platforms. The cloud services may also be used to provide other applications or services associated with observation platforms. For example, the other services or applications may be a web portal or service portal, a manager app, a log-on tool, a support manager, data analysis tools, and third party apps and computer systems.

Using structuring communications in an observation platform, as referred to herein, may refer to the following actions regarding communications between two or more users: disciplining, structuring, controlling, participating, discouraging, encouraging, influencing, nudging, making an example of, permitting, managing, managing to be in compliance with policies, measuring what goes on as a communication occurs, characterizing, enabling, observing, recording, correcting, directing, etc.

The structuring or disciplining process envisioned herein involves using a communications and computer system as a platform to listen to commands from users, interpret those commands, establish two-party and multiparty communications links, pass on messages, and store messages and commands, thereby permitting an owner or manager of a group of people to observe and analyze the effectiveness the group's interactions. In a way, it is like the central nervous system of an organism, wherein the organism is a group of people.

One purpose of structuring or disciplining a communication is for associates to become better customer service associates or sales people in a retail setting. The present technology may accomplish this goal by monitoring communications of the users that occur via communication devices. The communications may be monitored to derive context information from the communication such as the name of the user, geographic location of a user, the state or status of the user (e.g., busy, available, engaged, conversing, listening, out-of-range, not logged on, etc.), business metrics regarding the user's interaction with others, and commands from the user. The communications may be monitored by a computer system associated with a radio base station that acts as a central hub for the user communications. The computer system may convert audible, voice or speech communications to a text or machine-compatible format using standard and well-known techniques. The text may be used to derive the context information from the communication. The computer system may also store some or all of the communication including the time and geographic location of the device, the audible portion of the communication and the text format of the communication. The structured communications may extend beyond a single venue to multiple venues or storage locations without regard to geographic location. Customers or users may refer to customers who are purchasing items in an environment, past customers, potential customers, perspective customers, shoppers, browsers, or others who enter the environment and do not represent the environment in an official capacity such as an employee does.

In one embodiment, the computer system uses the derived context information to determine a destination of the communication and forwards or relays the communication to the destination. For example, a first user may attempt to contact a second user via communication devices. The first user sends the communication to the computer system associated with the radio base station. The computer system recognizes the first user and is able to derive context information regarding the communication and determine that the communication's destination is a third user. The computer system then relays the communication, via the radio base station, to a communication device associated with the third user. The computer system may also convert the communication to text and derive contextual or performance metrics regarding the first or third user. For example, the first user may be an associate in a retail setting and the third user is a customer. The first user may be responding to a query made by the third user. The performance metric may be the length of time it took for the first user to respond to the query or may be whether or not the query was satisfied or may be a different metric entirely. The computer system may derive and store more than one performance metric. The computer system may also access more than one communication regarding a user to determine some metrics. In one embodiment, the computer system is able to determine the state of the user based on either direct user action such as a button press or voice command; or based on inference from words being spoken, motions, locations or other contextual information. In one embodiment, the third user may be out of range of the radio base station and sends communications via a network associated with the computer system. In one embodiment, the third user may be part of a similar operation to that in FIG. 1A, i.e., another retail outlet or corporate headquarters for the same company in a different location as shown in FIG. 1C.

In one embodiment, the computer system is able to determine geographic locations of users based on information received from communication devices associated with the users. The geographic location data may be stored as data associated with a user's communications device at a particular time, or as a performance metric, or may be combined with other information to generate a performance metric. The geographic information may also be used by managers to manage or train associates or to optimize customer service.

A user, as referred to herein, may be a person or people such as, associates, employees, managers, trainees, trainers, customers, emergency responders, personnel, etc. In one embodiment, the user interfaces with a device for communications with other users. Such a device may be a handheld device, a headset, a Smartphone, an earpiece, a radio, a computer system, or other device capable of providing communications between users. Such users may be external to the operating entity and desire access via smart devices or applications.

A performance metric may also be a metric, a key performance metric or a business metric. A metric or performance metric as referred to herein may be any type of data associated with or derived from a communication between users, including the location of the communications device, or the words spoken and the contextual state at the time of a particular communication event. In one embodiment, the computer system is able to generate a visual representation of metrics. For example, the visual representation may be a map of the geographic location of the users in an environment or may visual demonstrate the availability status of a user. In another example, the visual representation may be textual information such as the number of communications sent by a user or the length of time it took for a user to respond to a communication. The performance metrics may be sent or displayed to a manager or other user for use in making decisions. The performance metrics may be used by the manager to optimize customer service in a retail setting by taking actions such as reprimanding or rewarding an associate or noticing that no associates are located near a group of customers. Performance metrics may also generate real-time alarms or notifications that action or coordination is needed.

The present technology provides for many examples of how structuring communications may be used in various environments for a variety of purposes. The following discussion will demonstrate various hardware, software, and firmware components that are used with and in computer systems and other user devices for structuring communications using various embodiments of the present technology. Furthermore, the systems, platforms, and methods may include some, all, or none of the hardware, software, and firmware components discussed below.

Content Distribution and Data Aggregation for Scalability of Observation Platforms With reference now to FIG. 1A, a block diagram of an environment 100 for structuring communications in an observation platform. Environment 100 includes devices 105, 110 and 130, radio base station 115, computer 120, database 125 and network 135. Environment 100 comprises components that may or may not be used with different embodiments of the present technology and should not be construed to limit the present technology. Some or all of the components of environment 100 may be described as an observation platform for structuring a communication.

The present technology makes use of communication devices. Radio base station 115 and devices 105, 110 and 130 may also be described as communication devices. Devices 105, 110 and 130 may be user devices that are mobile and employed by a user to communicate with other users via other devices. Communications between the devices may be described as signals. The devices 105, 110 and 130 may be a smart phone, a personal digital assistant, a fob, a handheld device, a headset device or other small electronic device. In one embodiment, devices 105, 110 and 130 employ speakers and microphones with control buttons for audible communications. The control buttons may be press to signal buttons, push to talk buttons, volume control buttons, and power on/off buttons or other standard buttons and may be options on a touch screen. Devices 105, 110 and 130 may be handheld, may be worn around the neck, and may be a headset worn on the head or behind the ear or otherwise interface with the human body. Devices 105, 110 and 130 may or may not comprise a screen or display such as a liquid crystal display (LCD). In one embodiment, devices 105, 110 and 130 do not comprise a display such that a user is not inundated with too many options or too much information from the device. A user device without a display may simplify communications and thus allow heads-up awareness and presence in the environment. Another user, such as a customer, may be more likely to employ the device for its intended purpose if the human interface is simplified.

Devices 105, 110 and 130 and other devices in environment 100 may be dispensed to a user upon entering environment 100 or may be brought by the user into environment 100. For example, in a retail setting associates may be issued devices by the employer or owner of the retailer setting. Customers in the retail setting may also be issued devices as they enter the retail setting. Customers may choose whether or not to accept the device or whether or not to use the device after accepting it. The associate devices and the customer devices may or may not be the same type or model of devices. Alternatively, the customer may bring a device into the retail setting such as a smart phone. The customer may download an app to the smart phone that will allow the customer to use the device for communications in the store with associates or others in accordance with present technology. The customer may remain anonymous or may elect to identify themselves. In one embodiment, recognition of the customer's identity is not required for additional services or offers.

Devices 105, 110 and 130 may be low power devices. The devices may use batteries or solar power including either ambient or battery solar power in a low duty-cycle manner to save power. In one embodiment, the devices have an automatic sleep function when location of the device does not change and no communications are sent or received after a period of time.

Radio base station 115 may be a communication device that is capable of communicating with devices 105, 110 and 130. Radio base station may simply be a component of computer 120 or may be a standalone device that is coupled with, connect to, or otherwise associated with computer 120. Radio base station 115 and computer 120 may be physically adjacent to one another or may be separated by a distance (e.g., cloud services). Computer 120 is able to instantaneously receive communications from radio base station 115 and to send communications to radio base station 115 for radio base station 115 to transmit the communication to its destination. Computer 120 is a computer system with a process and memory and is capable of executing commands, software and firmware. Computer 120 may be a desktop computer, a server computer, a cloud-based computer or other standard computing system or may be custom built for the present technology.

Radio base station 115 and devices 105, 110 and 130 employ standard techniques for communicating wirelessly. The communications may be performed using radio techniques such as near field communications, short wave radio, infrared, Bluetooth, Wi-Fi, standard wireless computer network protocols, etc. Devices 105, 110 and 130 may be able to communicate with each other directly or through radio base station 115. Devices 105, 110 and 130 communicate with each other via the computer system 120. In one embodiment, all communications in environment 100 are relayed through radio base station 115 which acts as a central hub. For example, device 105 may communicate with device 110 by device 105 sending a communication to radio base station 115, computer 120 derives that device 110 is the destination for the communication and relays the communication to device 110. This may occur automatically and quickly enough such that the users will not experience any undue lag in communications. In one embodiment, devices 105, 110 and 130 may communicate directly with computer 120. For example, a user may issue a command to computer 120 via device 105 or computer 120 may send information to device 105. Information send from computer 120 to device 105 may be an audible voice signal or may be textual, contextual, geographical or graphical data to be displayed at device 105 if it is properly equipped to do so.

In one embodiment, devices 105, 110 and 130 may communicate with one another directly, and their signals may be monitored and processed by computer system 120 via a monitoring system associated with the radio base station 115. Instructions or commands may still be directed towards the computer system 120.

In one embodiment, computer 120 is able to recognize a user sending a communication. The user may be recognized based on the device used to send the communication to computer 120 and radio base station 115. For example, device 105 may have a unique signature associated with its transmissions such that computer 120 can identify differentiate the device from another user. Such recognition of a user may then be employed by computer 120 for future communications with other devices. In one embodiment, the signal or communications between devices are encrypted. The signal may be encoded such that it is unique to a specific device. The encryption or encoding may be employed by computer 120 to recognize the user of the device. In one embodiment, the user may identify himself to the computer system 120 and the computer system 120 makes the association between user identification and device 105's internal electronic identification.

Computer 120 may determine that the destination of a communication is a single device or a plurality of devices.

Thus computer 120 may relay a communication from device 105 only to device 110 or may relay it to both device 110 and device 130. Computer 120 may determine that another user device is the destination of a communication originated by device 105 but may also directly respond to the communication by executing a command or sending a communication back to device 105. In one embodiment, a communication from device 105 has more than one characteristic or aspect. For example, the communication may have a first characteristic that corresponds to an audible source such the words spoken by a user employing device 105. The communication may also contain contextual information such as engaged, available, listening to information, returning to coverage zones, or other behavioral/contextual information. The communication may also have a third characteristic that comprises geographical position information of device 105 or may have information indicative of a geographic position of device 105. Computer 120 is able to determine a geographic position and direction of motion of a device from the information indicative of a geographic position of device. The motion may also be described as path of travel. A characteristic of the communication may be a portion of the communication, data associated with the communication, attributes of the communication, or metadata regarding the communication.

In one embodiment, computer 120 comprises a storage medium for storing some or all of a communication. Computer 120 may store all communications between devices in environment 100. Computer 120 may store communications for a pre-determined amount of time. Different characteristics of the communication may be stored including portions of the communication itself. Additionally, the computer may request and store all audible information regardless if the user presses a push to talk button or otherwise signals the need to begin a communication. For example, the communication may comprise an audible portion, a text portion, information indicative of a geographical position, and a geographical data portion. The audible portion may also be converted to text. Computer 120 may store all or some of the different portions including the portion converted to text. Computer 120 may store geographic position information regarding a device over a period of time such that a path of travel of the user may be inferred. Thus the position and context of a user may be mapped, tracked or predicted through a physical environment or area.

In one embodiment, computer 120 receives a communication from a device with a portion of the communication that corresponds to a voice of the user of the device. Computer 120 is able to convert the audible portion to information used by computer 120 to derive context information from the communication to determine performance metrics regarding the communication or the user of the device. The resulting information may also be interpreted as a command for computer 120 to execute. The resulting information may also be employed to determine a destination for the communication.

In one embodiment, each speaker is identified with a unique identifier with each voice file so that a speech-to-text engine can train on the speaker's voice and more accurately choose words from the dictionaries and individual user grammars. Individually customized dictionaries and grammars may be used for the sequential context of the spoken words. For example, saying, "urgent Bob" is interpreted by looking up the first word in a command dictionary and the second word in a names or places dictionary. In one embodiment, a frequency table is built for each user defining how frequently they call a name or place to improve the probability of selecting the correct word. In one embodiment, if a command, name, or place is not understood, the system may default to the most likely destination group. The user can easily opt out of the default destination and start again. Alternatively, if the command, name or place is not recognized, the computer system 120 may be programmed to default to a simple reply such as "command not recognized" or "person not found."

In one embodiment, computer 120 executes a command received from device 105. The command may be directly received from device 105 or may be received in an audible voice signal with is converted to text and then interpreted to be a command for computer 120. The command may be to initiate a virtual voice connection between device 105 and device 110. The command may be to initiate a connection to a telephony system such that a user of device 105 may communicate with another user who is employing a telephone for communication. The command may be for computer 120 to store information into or extract information out of database 125.

In one embodiment, computer 120 is able to access database 125 over network 135. Network 135 may be a local area network, a wireless network, the Internet or another computer network. In one embodiment, database 125 is a component part of computer 120 and network 135 is not required for computer 120 to access database 125. Database 125 may comprise an inventory of product or any other type of information. For example, in a retail setting a customer may use a device to communicate with an associate regarding whether the retail setting has a particular product in stock. The associate may use key terms to query computer 120 regarding whether the product is in stock. Computer 120 may convert the associate's voice to text and recognize the command regarding whether the product is in stock. Computer 120 then queries database 125 and sends a response back to the associate and/or customer. The response may be sent back using an audible signal or a signal to be displayed on a screen at the user device. Similar examples may be constructed around product location databases, workforce scheduling systems, on-floor zone assignments, time clock systems or other information systems used for operations and reporting. Alternatively, computer 120 may recognize a command based on the converted text without a user saying key terms.

Database 125 may be a local inventory or a larger inventory. In one embodiment, database 125 is not an inventory but comprises different data. For example, a user may employ the device to communicate with and command computer 120 to perform a key word search of the Internet using a search engine such as a website search engine.

Figure 1B:
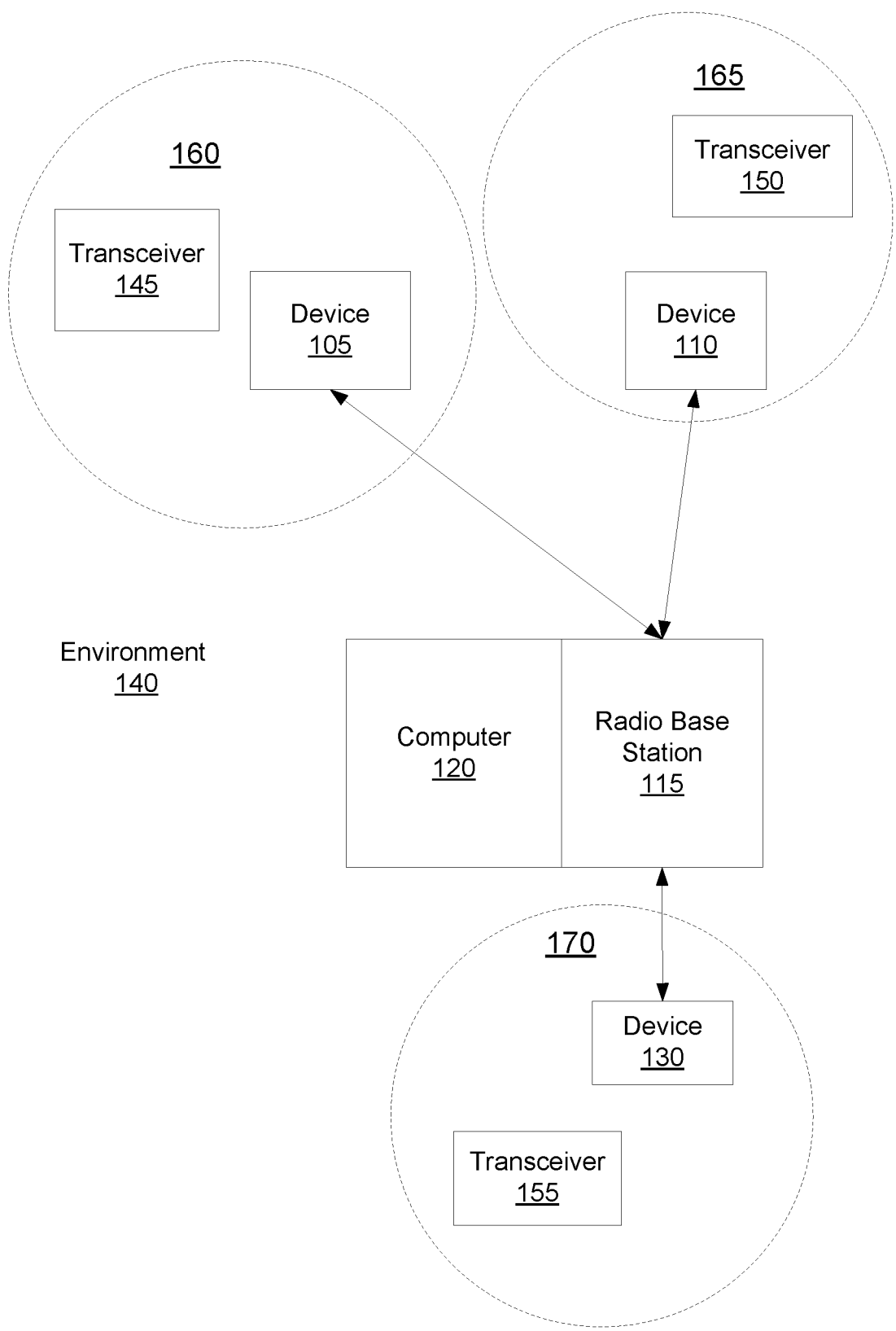
FIG. 1B illustrates a block diagram of an example environment for an observation platform for structuring a communication in accordance with other embodiments of the present technology.
Figure 1C:
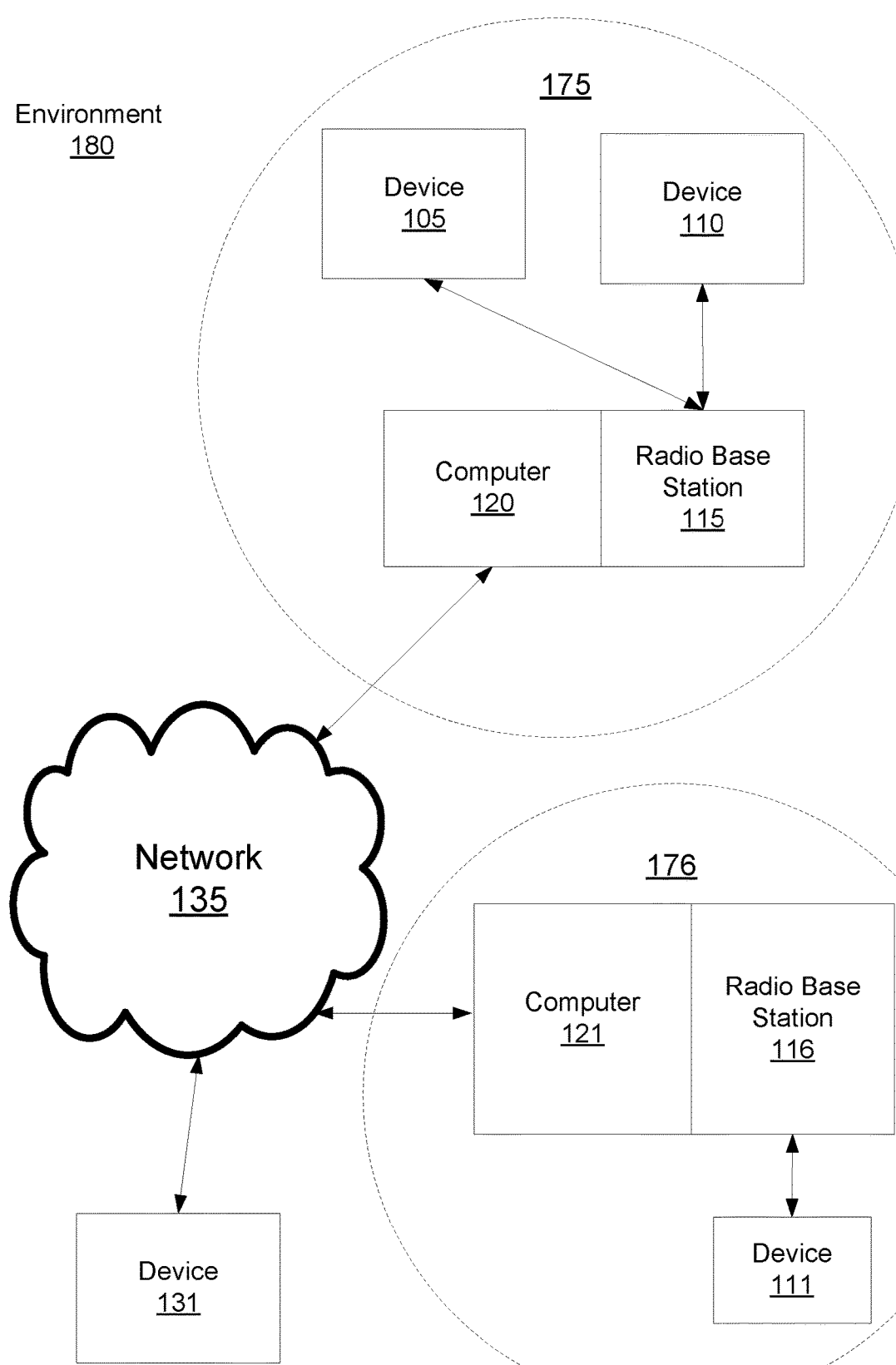
FIG. 1C illustrates a block diagram of an example environment for an observation platform for structuring a communication in accordance with other embodiments of the present technology.

With reference now to FIG. 1B, a block diagram of an environment 140 for structuring communications in an observation platform. Environment 140 includes devices 105, 110 and 130, radio base station 115, computer 120, transceivers 145, 150, and 155, and regions 160, 165, and 170. Environment 140 comprises components that may or may not be used with different embodiments of the present technology and should not be construed to limit the present technology. Some or all of the components of environment 140 may be described as an observation platform for structuring a communication.

Transceivers 145, 150, and 155 are capable of sending and receiving signals to and from radio base station 115 and devices 105, 110 and 130. Transceivers 145, 150, and 155 may or may not be networked to one another and to either radio base station 115, computer 120 or both. Transceivers 145, 150, and 155 may be transceivers such as wireless routers in a computing network. The transceivers may relay a communication from a user device to computer 120. A communication or signal may be routed through a plurality of transceivers before reaching computer 120.

In one embodiment, the transceivers may be uniquely identifiable such that a communication may comprise a characteristic that identifies the communication as being routed through a given transceiver. This identification of the transceiver may be employed by computer 120 to determine a geographic location of a device or user. Thus, a characteristic of the communication may be an identity of a transceiver and comprises information that is indicative of a geographic position. Computer 120 may determine that a device is in a geographic region that is associated with a transceiver such as region 160 associated with transceiver 145. Computer 120 may also use geographic information and user motion characteristics to predict and pre-set association to the next likely transceiver.

In one embodiment, computer 120 determines the geographic location of a device based on a transceiver signal strength received at the device from one or more transceivers. For example, device 130 may receive signals from both transceivers 150 and 155 each with a corresponding signal strength. The signal strength data is sent from device 130 to computer 120 as a characteristic of a signal or communication sent to computer 120. The signal strength data is then used by computer 120 to determine the geographic position of device 130.

Transceivers 145, 150, and 155 each have an associated region such as regions 160, 165, and 170. The regions may define the transmission range of the transceiver or may be defined based on some other criteria. In one embodiment, the regions may be described as wireless hotspots. Regions 160, 165 and 170 may be well defined geographical regions either indoors or outdoors and me be known to computer 120. Regions 160, 165 and 170 are depicted as not overlapping one another. However, the regions may or may not overlap one another. In one embodiment, computer 120 may determine the geographic location of a device based on its location in one or more regions. For example, device 105 may be located in region 160. In another example, regions 160 and 165 may be overlapping and computer 120 determines that device 110 is in the overlapping portions of region 160 and 165 because a characteristic of a communication from device 110 indicates that device 110 is receiving signals from both transceiver 145 and 150. Thus a characteristic of signal sent from a user device to computer 120 may be contents of a communication, a portion of a communication corresponding to an audible source, signal strength data of a transceiver, an identity of a transceiver, geographic position data, or other information.

In one embodiment, computer 120 determines the geographic motion, movement, or path of travel of a user based on transceiver signal strengths received at the device from one or more transceivers. Movement of the communications device 130 may be derived from data regarding signal strength measurements made at one or more of the transceivers, where the signal strength is measured and sampled at successive time intervals, via well-known methods. For example, as a user moves about the region in environment 140, the signal strength will increase at one transceiver device and decrease at another. Movement of the communications device 130 may also be derived from internal components in the device such as accelerometers, again via successive time samples of acceleration data. This data may be used to detect a smaller range of movement.

With reference now to FIG. 1C, a block diagram of an environment 180 for structuring communications in an observation platform. Environment 180 includes devices 105, 110, 111 and 131, radio base stations 115 and 116, computers 120 and 121, network 135 and regions 175 and 176. Environment 180 comprises components that may or may not be used with different embodiments of the present technology and should not be construed to limit the present technology. Some or all of the components of environment 180 may be described as an observation platform for structuring a communication.

In one embodiment, device 105 and 110 are located within region 175. The components depicted within region 175 may be described as an observation platform. Region 175 may be described as having a radio range, or span of operating distance. For example, radio base station 115 may have a physical limit regarding the distance which it may transmit radio signals. Therefore, a device outside of the radio range, such as devices 131 or 111 will not be able to communicate with computer 120 via a radio signal transmitted from radio base station 115. Additionally, devices 105, 110, 111 and 131 may also have a limited radio range.

These limitations may be overcome by computer 120 relaying the communication to either device 131 or a second observation platform within region 176 via network 135. Therefore, devices 105 and 110 may communicate with either device 111 or 131 where the communications are relayed by computer 120 and network 135. Region 176 may be described as a second observation platform with components that are duplicates of or similar to components of region 175. The regions 175 and 176 may comprises any number of communication devices or other components such computers, routers, and transceivers. Thus, the present technology provides for structured or disciplined communications between at least two user devices that may or may not be within radio range of one another.

In one embodiment, the communications between computer 120 and devices 105 and 110 are accomplished via radio signals and the communications between device 131 and computer 120 are accomplished via network 135. In one embodiment, the connected between network 135 and device 131 is telephony call such that device 105, which may not be a telephone, places a phone call to device 131, which is a telephone, via the observation platform. In such an embodiment, network 135 may comprise both a computer network and a phone network or cloud.

In one embodiment, device 131 and/or region 176 may be physically remote relative to radio base station 115. For example, all the components shown within region 175 may be located within radio range of one another at a first location, but device 131 and region 176 are located at a second and third location outside of region 175. These first, second and third locations may be separated by any length of distance. The second or third location may be hundreds or even thousands of miles away from the first location or may be less than a mile away but still outside of region 175. In one embodiment, computer 120 and radio base station 115 are located at a first physical address such as a street address for a building or other physical location, device 131 is located at a second physical address, and computer 121 and radio base station 116 are located at a third physical address.

In one embodiment, computer 120 and radio base station 115 are associated with a retail environment and region 175 includes the retail floor as well as an office or other area designated for associates, managers, or employees of the retail environment. However, computer 121 and radio base station 116 are located in region 176 are located at a second retail environment. The first and second retail environments may be related to one another such as both being a franchise of the same business or enterprise. Thus, a customer or associate may be located in region 175 associated with a first franchise, e.g. a first observation platform, and speak with an associate using device 111 in a second franchise, e.g., a second observation platform. The customer or associate may ask questions regarding the inventory of an item at the second franchise or speak with an associate at the second franchise that has knowledge not known by associates at the first franchise.

In one embodiment, where region 175 and region 176 each comprise separate observation platforms, the present technology is employed to manage and observe the observation platforms. For example, applications 1314 of FIG. 13 may be employed with the observation platforms. These applications allow for the scalability of observation platforms such that a single user may have access to the data from a plurality of observation platforms and the ability to send messages to all or some of the devices associated with the observation platforms simultaneously in a scheduled transmission.

Figure 2:
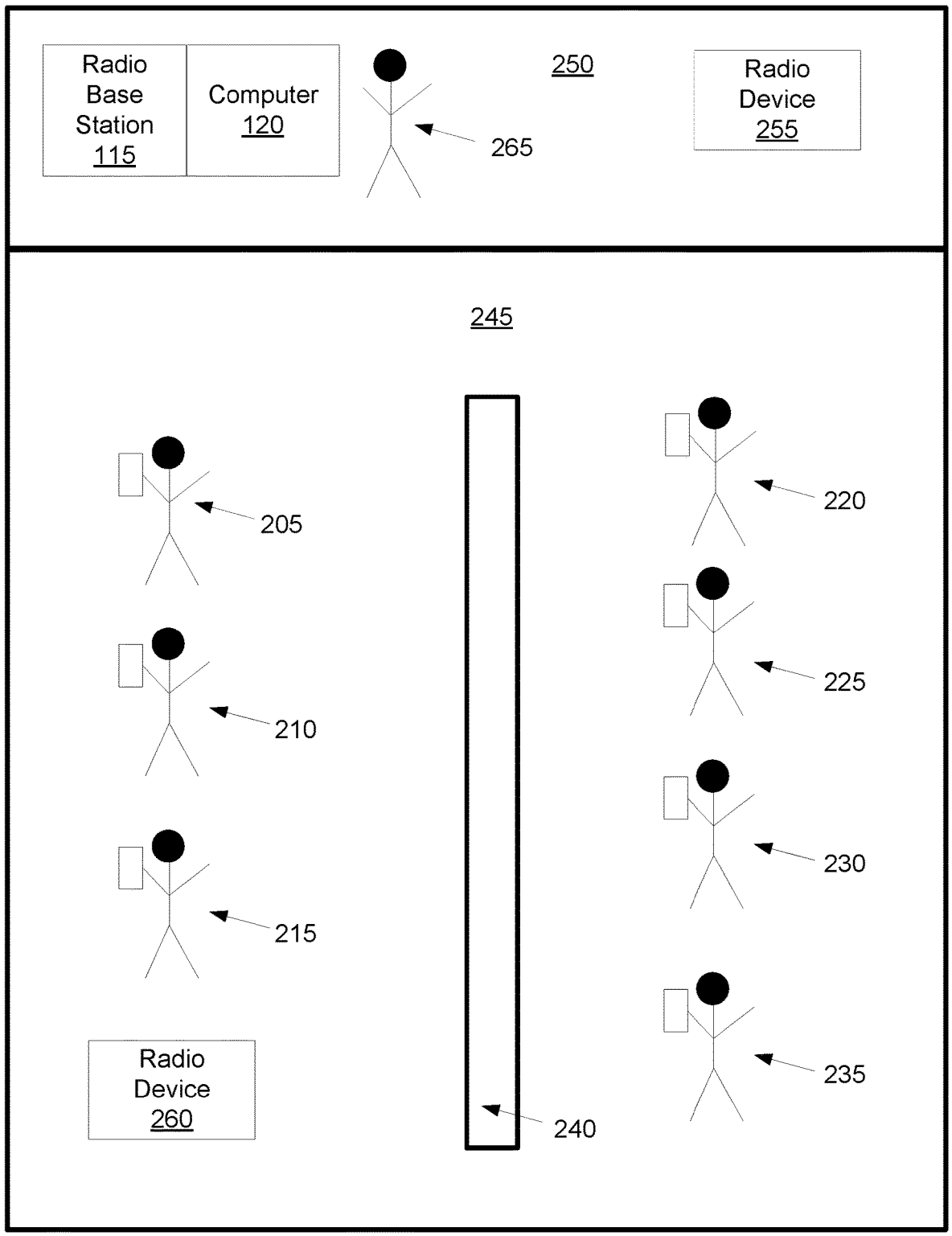
FIG. 2 illustrates a block diagram of an example environment for structuring communication in an observation platform in accordance with embodiments of the present technology.

With reference now to FIG. 2, a block diagram of an environment 200 for structuring communications in an environment. Environment 200 includes radio base station 115, computer 120, users 205, 210, 215, 220, 225, 230, and 235, structure 240, area 245, area 250, radio devices 255 and 260 and user 265. Environment 200 comprises components that may or may not be used with different embodiments of the present technology and should not be construed to limit the present technology.

Environment 200 depicts a setting in which the present technology may be employed. Environment 200 may be, but is not limited to, retail settings, public-stage floors, outdoor venues, concerts, police scenarios, disaster areas, and other environments where communications occur between users. Areas 245 and 250 are depicted as being enclosed. However, the present technology may be implemented in an outdoor or indoor environment or a combination of the two. Users 205, 210, 215, 220, 225, 230, and 235 are depicted as each holding a device such as device 105 of FIG. 1. The devices do not necessarily need to be handheld. Users 205, 210, 215, 220, 225, 230, and 235 may be a variety of different types of users. For example, the users may be associates and customers intermingled in a retail setting. Area 245 may be the retail floor while area 250 is a back office or other area designated for associates, managers, or employees of the retail environment.

Structure 240 may be a display, shelves, aisle divider, or other structure that physically separates spaces in area 245. For example, users 205, 210, and 215 are depicted as being in separate space of area 245 than users 220, 225, 230, and 235. Computer 120 may be able to interact with users 205, 210, 215, 220, 225, 230, and 235 and determine the user's geographic locations as well as act as a central hub for all communications between the users. In one embodiment, computer 120 recognizes a group of users associated with communication devices. The group may be based on a classification or type of user or may be based on a location of said users. In one example, computer 120 recognizes that users 205, 215, 230, and 235 are associates and users 210, 220, and 225 are customers in a retail setting. The associates may be considered a first group and the customers a second group. In a second example, computer 120 recognizes that users 205, 210, and 215 are a first group in a separate space of area 245 than the second group of users 220, 225, 230, and 235. Computer 120 may then employ the recognition of groups to generate visual representations of features of the group and its communications. It should be appreciated that groups can simultaneously exist in many locations and are not constrained by building walls or geography.

In one embodiment, environment 200 comprises radio devices 255 and 260 used for communication with user devices and radio base station 115. Radio devices 255 and 260 may or may not be networked with radio base station 115 to provide additional coverage or range for radio base station 115. For example, radio devices 255 and 260 may be antennas or radio repeaters for radio base station 115. In one embodiment, radio devices 255 and 260 are wireless routers for computer networking. Computer 120 may employ radio devices 255 and 260 to determine a geographic location of a user. Radio devices 255 and 260 and transceivers 145, 150 and 155 may each have the same capabilities and features as one another.

The geographic location or position of a user may be determined by computer 120 receiving periodic clues or evidence of the geographic location of the user device and then computer 120 infers or deduces the geographic location based on the evidence or clues. For example, the user device associated with user 205 may receive a plurality of signals from radio base station 115 and radio devices 255 and 260. Each signal has a unique signature at the current position of user 205. The signatures of each source are periodically sent to computer 120 or as a component characteristic of any communication. Computer 120 may then determine the geographic position of user 205 based on the signatures of each source and the known location of the sources e.g., radio base station 115 and radio devices 255 and 260. In one embodiment, the user device knows its geographic position based on geographic position component which is part of the user device. The geographic position component may be a component device or chip that employs the global positing system, other satellite navigation system, inferred signals, radio signals or RFID signals for determining a geographic location or position. A user device with a geographic position component may transmit the determined geographic position to computer 120 periodically or as part of a communication. Thus computer 120 may know the location of a user at a given time based on the geographic position of the device associated with the user.

In one embodiment, user 265 interfaces with computer 120 to use the present technology to optimize communications. Computer 120 may determine and display performance metrics or visual representations regarding communications to user 265. User 265 may then use the performance metrics and visual representations to make decisions. For example, user 265 may be a manager of associates who can identify that a customer has asked for assistance at a given location but no associates have responded. The manager may then use the present technology to request an associated to assist the customer. In one embodiment, user 265 is able to directly use computer 120 and radio base station 115 to communicate with other users by individual identification, location groupings or contextual groupings.

In one embodiment, user 265 interfaces with computer 120 to use the present technology to optimize geographic location. User 265 may be a customer and requests help from computer 120. Computer 120 determines the associate nearest the location of user 265 and provides the current and updated location of user 265 until intercepted by the associate. In one embodiment, user 265 may request help verbally, not engaging computer 120, and that request is heard by all nearby associates whose context is "not engaged with shoppers."

In one embodiment, computer 120 derives performance metrics, business metric or metric from the communications between users. The metrics may be used to generate visual representations. The metrics and/or visual representations may be employed to make decisions. The metrics and visual representations may be sent to another computer system or device. A metric may be based on the behavior of a user, the context of the user, information carried by the tone and quality of voice, and the user's spoken or signaled communications.

A sales performance metric may be determined by linking sales with users, measuring busy (or "engaged with shopper") times of users, and ascertaining busy status of user. The busy status of a user may indicate that the user is engaged in a communication, a task, assisting a customer or otherwise occupied. A response time metric may also be determined by measuring the time it takes to answer a user's question, or how long it takes to receive assistance after asking for it. A customer satisfaction metric may also be derived based on the text of the customer's communication. A task performance metric may be determined by measuring the length of time an associate is currently engaged in performing said task, including noting pending and completed tasks. Metrics may be used by a manager to reward good behavior or correct undesired behavior. Additionally, because the communications and other audio information have been recorded, the communications may be used in training as examples.

Visual representations may be described as communication traffic intensity maps between users and/or groups such as who talks to whom, how frequently and at what time of day; who asks questions and who responds; who responds to tasks, when and how long it took to respond; and who has listened to which training podcasts, where they listened and when. Visual representations may also be described as location maps such as, a status of when users indicate that they are engaged, busy or available, when users ask questions; quiet areas where no communications or engagements are occurring; where users are not located; where selling tips were left and by whom; location-based-tasks and the times it takes to complete them; a path of where users have traveled geographically; and a map of the environment. With this observation platform for structuring communications, a more complete observation of many of the events in the interaction between and among all users can be observed, cataloged, and analyzed, providing a great deal of useful information to any manager of the overall process.

Figure 13:
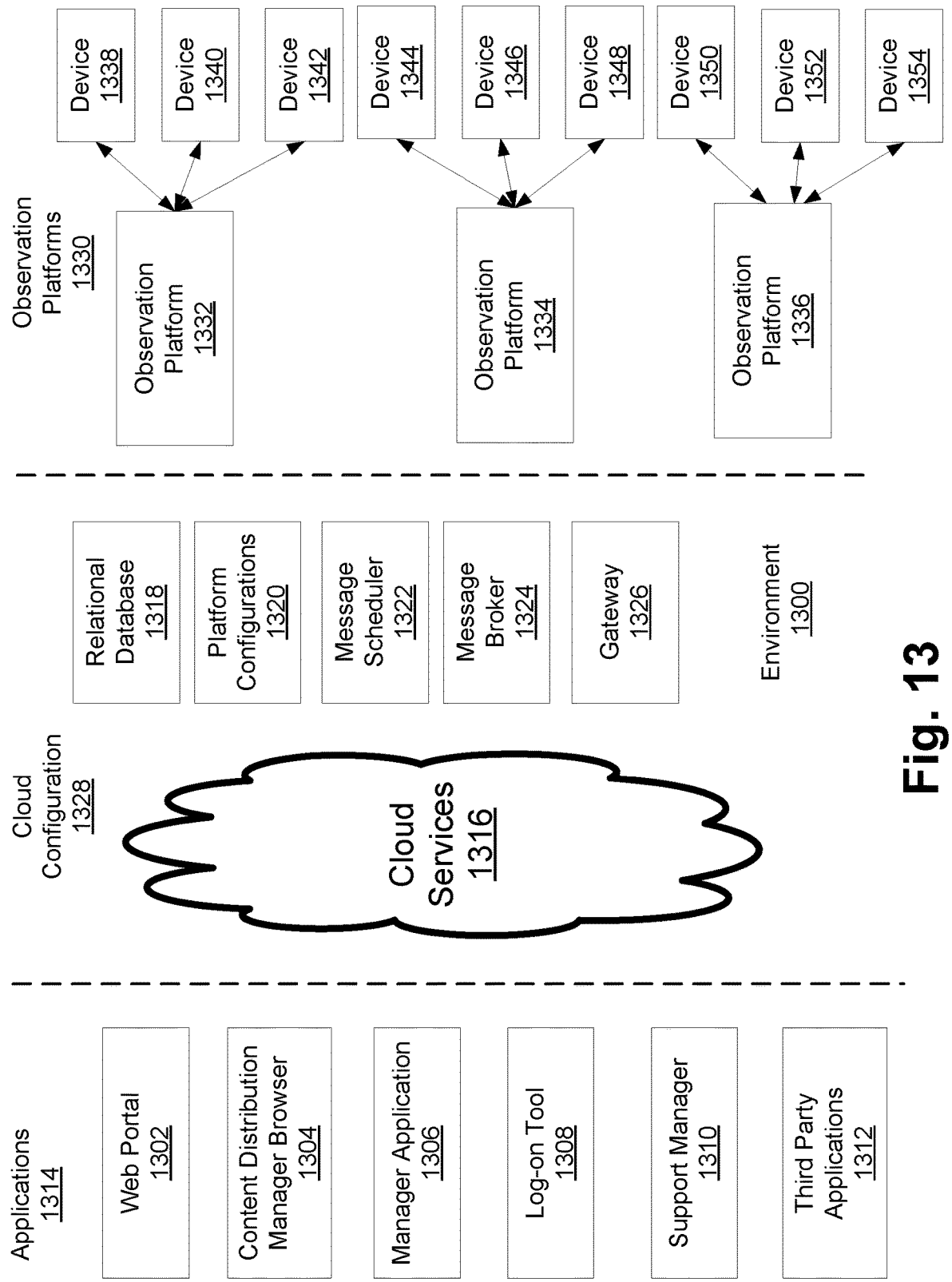
FIG. 13 illustrates a block diagram of an example environment for managing and distributing content in a plurality of observation platforms in accordance with embodiments of the present technology.

With reference now to FIG. 13, a block diagram of an environment 1300 for a content distribution manager for scalability of observation platforms. Environment 1300 depicts multiple components and as a whole may be described as a content distribution manager. Specifically, content distribution manager browser 1304 depicts a browser that may be an interface that controls the tools of the content distribution manager including tools such as message scheduler 1322 and message broker 1324. Environment 1300 comprises components that may or may not be used with different embodiments of the present technology and should not be construed to limit the present technology.

The right column of environment 1300 refers to observation platforms 1330 which specifically comprises observation platforms 1332, 1334, and 1336. It should be appreciated that observation platforms 1332, 1334, and 1336 have the same capabilities and features of the observation platforms described in FIGS. 1A-1C and 2. Moreover, observation platforms 1330 may refer to the three depicted observation platforms but may also describe any number of observation platforms such as hundreds or thousands of observation platforms. In other words, the present technology may be used to manage, observe, measure, control, and otherwise operate with any number of observation platforms thus associating a large group of observation platforms with one another and providing for scalability in the management and use of a large number of observation platforms.

Each of observation platforms 1332, 1334, and 1336 are depicted with three devices, devices 1338, 1340, 1342, 1344, 1346, 1348, 1350, 1352, and 1354 respectively. It should be appreciated that and observation platforms 1332, 1334, and 1336 may have any number of devices associated with them and will likely have more than three devices associated with them. Devices 1338, 1340, 1342, 1344, 1346, 1348, 1350, 1352, and 1354 have all of the same features and capabilities of devices 105, 110, and 130 of FIG. 1C.

The left column of environment 1300 depicts applications 1314. The components of applications 1314 may refer to applications executing on a computer system or systems but may also refer to specific purpose devices built for the present technology. In an embodiment where one of applications 1314 refers specifically to an application, the application is carried out on a hardware computing device or devices and may make use of cloud computing techniques.

In one embodiment, web portal 1302 refers to a web portal or service portal that is employed by a user to configure a local observation platform and the policies therein. Web portal 1302 may be used to change network passwords and add remove, or reassign employees and their devices within the observation platform. Web portal 1302 may also be used to create groups within the observation platform. For example, all of the devices that are used by a department such as the plumbing department in a hardware store may be placed in a group via the web portal 1302.

In one embodiment, groupings may be determined by any of the characteristics determined by the context information of the users by each observation platform(s) and aggregated in the content distribution managers, such as: location, motion, communications patters or current user activity; or by pre-assigned roles, responsibilities or functions, such as: plumbing experts, register trained employees, housekeeping, or marketing executives. For example, a change in return policy may be communicated to all register trained employees as they arrive to the register area and must be acknowledged so that the web portal shows who has heard the message, where and when they heard the message, and where and when they verbally acknowledged the receipt.

In one embodiment, web portal 1302 is a software application that is accessed via a uniform resource locator (URL) by any computing device that employs a web browser. Web portal 1302 may comprise an application program interface (API) or graphical interface that is employed by a user of web portal 1302. A user of web portal 1302 may be required to provide authentication to access web portal 1302. In one embodiment, web portal 1302 has different levels of authentication allowing different users different levels of access each with differing levels of access or abilities to configure the observation platform. For example, local policies of observation platform may be configured by web portal 1302. In one embodiment, web portal 1302 is employed by users who are locally associated with the specific observation platform as the web portal 1302 provides access and control that may only be of interest to a local user. For example, the local user may be a technical support specialist or store manager located within the physical environment associated with observation platform. In one embodiment, the user of web portal 1302 may be a technical support specialist associated with a plurality of observation platforms and is contacted by a local user of the specific observation platform and asked for assistance with configuring the specific observation platform.

In one embodiment, web portal 1302 may be hosted or executed on computer systems local to the specific observation platform in which web portal 1302 is used to configure. In one embodiment, web portal 1302 is hosted or executed on computer system physically remote to an observation platform and is located in cloud services 1316. Web portal 1302 may be located in cloud services 1316 and designed to configure any number of different observation platforms.

In one embodiment, content distribution manager browser 1304 is a software application that is accessed via a uniform resource locator (URL) by any computing device that employs a web browser. Content distribution manager browser 1304 may comprise an application program interface (API) or graphical interface that is employed by a user of content distribution manager browser 1304. A user of content distribution manager browser 1304 may be required to provide authentication to access content distribution manager browser 1304.

Content distribution manager browser 1304 is employed by a user to manage and control messages that are sent to a plurality of observation platform and the devices therein. In one embodiment, content distribution manager browser 1304 can retrieve content for a message or can be employed to generate new and original content for a message. In one embodiment, the content is an audio file such as a WAV file that is the recording of an audible voice such that when the message is delivered to and accessed by a destination device, the message will playback the audible voice. The content distribution manager browser 1304 may be employed by a manager to record a voice message which is then delivered to a plurality of devices.

In one embodiment, a message controlled by content distribution manager browser 1304 is delivered to a plurality of devices simultaneously. This may be accomplished by content distribution manager browser 1304 sending out the message to the various devices at the same time, or content distribution manager browser 1304 may deliver the message to a plurality of observation platforms with commands or instructions to deliver the message to specified devices within the observation platform at a designated time. Delivering the messages to the devices may also be described as pushing the message. The manager using the content distribution manager browser 1304 may designate the time a message should be available for the users and how long that message should be available to hear (end time). Alternatively, the content distribution manager browser 1304 may be employed to deliver the same message to different devices at different times. For example, the message may be delivered to store managers within observation platforms at a designated time before the message is delivered to other employees within the same observation platforms. The user of content distribution manager browser 1304 may also specify that additional content or messages are sent to different devices. For example, additional content may be sent to store managers or additional content may be sent to devices associated with a specific department in a retail setting such as the painting department.

In one embodiment, content distribution manager browser 1304 is employed to specify who or what devices are to receive the message with its content. For example, the user of content distribution manager browser 1304 may have authority over several different environments each with its own observation platform. The user may wish that the message only be sent to specified observation platforms within the plurality of observation platforms. Alternatively, the user may specify that all of the devices within all of the observation platforms receive the message, or only devices located within the physical boundaries of the observation platform at the designated time receive the message, or only devices associated with a specific department receive the message or only devices associated with store employees and not customers receive the message. The possible options for specifying which devices receive a message and when are limitless. A message may also be generated and sent to a specific individual. In one embodiment, content distribution manager browser 1304 employs the groups created by web portal 1302 to determine which devices a message may be sent to. It should be appreciated that the content of the message may be a voice recording but may also be other content such as text, images, or video. In one embodiment, the message is sent to a given device with a command to notify the user of the device that there is a message received. The notification may be a light, a blinking light, a specific color of light, a sound, a textual notification, or any other type of notification that the device is capable of providing.

Content distribution manager browser 1304 may be employed by a user that has high level access to the plurality of observation platforms. For example, a corporation may have hundreds or thousands of hospitality locations or store fronts that each makes use of an observation platform. The corporation may have a headquarters or central office with employees who have access to content distribution manager browser 1304 with the ability and authority to send a message to anyone and everyone associated with the corporation.

In one embodiment, a device that receives a message from content distribution manager browser 1304 automatically sends a confirmation back to content distribution manager browser 1304 that the message has been received. Additionally, once the message has been accessed or heard by the user of the device, the device may send a message back to content distribution manager browser 1304 that the messaged has been heard or otherwise accessed. In one embodiment, the message may be a mandatory message that the user of the device is required to access and listen to. For example, process 1200 herein describes various embodiments of mandatory messages and consequences, rules or policies associated with mandatory messages.

In one embodiment, manager application 1306 a software application or app that is accessed via a mobile computer system such as a smart phone or tablet. In one embodiment, the mobile computer system executes an Android operating system. In one embodiment, the mobile computer system executes an iOS operating system. Other operating systems may also be employed. Manager application 1306 may be an app available for download and installation on the mobile computer system. The manager application 1306 is designed with an API or graphical interface specific to a mobile computer system such as a smart phone and to be used in the field by a user or manager associated with at least one observation platform. The user of manager application 1306 may be a regional manager that has access to a plurality of observation platforms. The regional manager may regularly travel between the physical locations of the plurality of observation platforms and needs to have access to the observation platforms while physically remote and in the field on the go.

In one embodiment, manager application 1306 allows the user of manager application 1306 to communicate with or monitor any device or plurality of devices within any of the observation platforms associated with the user. Manager application 1306 also is able to report statistics or observe or monitor communications with any of the observation platforms associated with the user. For example, the manager application 1306 may be able to listen in to communications happening in real time within an observation platform or may be able to play back past recorded communications. In one embodiment, the manager application may operate in a manner identical to the mobile devices in the observation platform as a peer-like device. In this mode the manager application may broadcast or direct communications to specific devices, receive alerts and provide both a primary signal for communication and a secondary signal for determining geographic location. In one embodiment, the peer-like device may be able to operate and interact with devices within an observation platform without directly communicating with a central computer system. In other words, the central computer system may or may not be required for receiving and relaying messages from the manager application. The manager application 1306 may also be employed to send announcements or messages similar to content distribution manager browser 1304. The manager application 1306 may communicate directly through a network with a given observation platform or may use cloud services 1316 and gateway 1326 to communicate with a given observation platform.

In one embodiment, log-on tool 1308 is a software application that is accessed via a uniform resource locator (URL) by any computing device that employs a web browser. Log-on tool 1308 may comprise an application program interface (API) or graphical interface that is employed by a user of log-on tool 1308. In one embodiment, log-on tool 1308 is employed by a user of a device in an observation platform that is having trouble logging onto the observation platform verbally.

In one embodiment, support manager 1310 is a software application that is accessed via a uniform resource locator (URL) by any computing device that employs a web browser. Support manager 1310 may comprise an application program interface (API) or graphical interface that is employed by a user of support manager 1310. Support manager 1310 is a tool for a user to see network and system performance metrics, observe who was talking to whom, hear all or selected communications, respond in real-time with spoken responses, collect and play messages, and/or make and summarize real-time performance/user activities to determine trends or generate alarms Support manager 1310 also keeps track of all devices within the observation platform as well as technical details such as the connection point a device is using, where the device is located within the physical boundaries of the observation platform, battery state of the device and if charged, where user has volume set for a device, environmental noise and sounds, and tracks communications and messages. In one embodiment, support manager 1310 has an alarming feature that mines relational database 1318 in the cloud and creates alarms or manipulates relational database to create alarms after detecting an anomaly. It should be appreciated that support manager 1310 is designed to be used by a store help desk so they know what is going on in a technical way, a support center supporting a plurality of observation platforms, or an escalation center capable of troubleshooting and correcting more complex issues.

In one embodiment, third party apps and computer systems 1312 refers to software applications and computer system created by third parties to be implemented within the observation platform(s). For example, a third party may create an application that makes use of the data generated by the observation platform. Such software may then sends results, reports, alarms, or other data back to the users within the observation platform or to the web portal for decision support, action planning or coordinating immediate actions within the observation platform(s).

In one embodiment, third party apps and computer systems 1312 refers to other software applications and computer system created by third parties to be implemented within the observation platform(s). This third party application may make use of externally derived data that is relevant to the operation of the enterprise which needs to be communicated to groups of observation platforms or groups of uses in near-real-time per the policies of the enterprise. For example, door counter or video derived traffic information may be used to alert a group of uses within an observation platform that action is necessary to improve coordination on the floor. Additionally, this third-party application information may be aggregated within the content distribution manager so that managers, district managers, regional managers or enterprise executives may overview patterns of operations between a plurality of observation platforms.

In one embodiment, cloud services 1316 refers to cloud computing techniques and hardware that may be employed in cloud configuration 1328 to assist observation platforms and embodiments of the present technology. Relational database 1318 may be located in cloud services 1316 and comprises data generated and related to one or more observation platforms. Platform configurations 1320 refers to configurations that may be default configurations and policies to be implemented and used by a specific observation platform. Message scheduler 1322 and message broker 1324 may be software applications located in cloud services 1316 and employed by content distribution manager browser 1304 and manager application 1306 as well as other applications in applications 1314 to send and/or receive messages to/from devices located in observation platforms 1330. Gateway 1326 is a security gateway located in cloud services 1316 and is employed to ensure that only authorized programs and users have access to the observation platforms.

Figure 3:
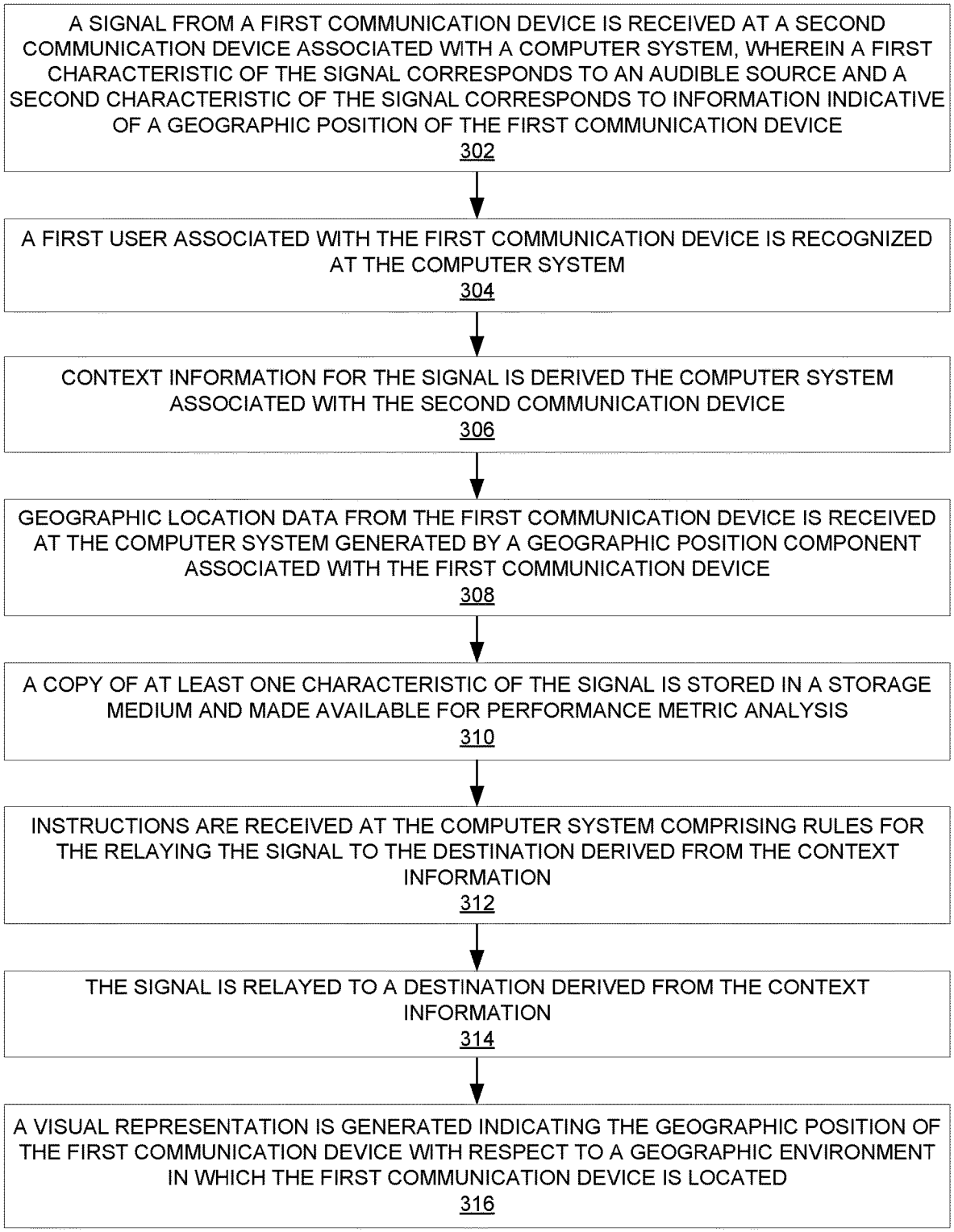
FIG. 3 illustrates a flowchart of an example method for structuring communication in an observation platform in accordance with embodiments of the present technology.

Operations of Using Structured Communications in an Observation Platform and Content Distribution and Data Aggregation for Scalability of Observation Platforms FIG. 3 is a flowchart illustrating process 300 for using structured communication in an observation platform in accordance with one embodiment of the present technology. Process 300 may also be described as disciplining communications in an observation platform. In one embodiment, process 300 is a computer implemented method that is carried out by processors and electrical components under the control of computer usable and computer executable instructions. The computer usable and computer executable instructions reside, for example, in data storage features such as computer usable volatile and non-volatile memory. However, the computer usable and computer executable instructions may reside in any type of non-transitory computer usable storage medium. In one embodiment, process 300 is performed by the components of FIG. 1A, 1B, 1C or 2. In one embodiment, the methods may reside in a computer usable storage medium having instructions embodied therein that when executed cause a computer system to perform the method.

At 302, a signal from a first communication device is received at a second communication device associated with a computer system, wherein a first characteristic of the signal corresponds to an audible source and a second characteristic of the signal corresponds to information indicative of a geographic position of the first communication device. Additional characteristics of the signal may include contextual information and environmental information. For example, the audible source may be the voice of a user, the signal characteristics may include signal signature information and contextual/environmental information may include user status (e.g., engaged or on-break) and/or background noise levels.

At 304, a first user associated with the first communication device is recognized at the computer system.

At 306, context information for the signal is derived at the computer system associated with the second communication device. The context information may be geographic information, data regarding length or time of communication, or text of the communication. In one embodiment, speech to text recognition techniques are employed to covert an audible communication to text. In one embodiment, the context information is a command for the computer system to perform. In one embodiment, the signal is encrypted or encoded uniquely with respect to the first communication device. The context information may be a command to the computer system. For example the computer system may be commanded to access a database in response to a query or may be given information to store for future reference.

In one embodiment, the information is a command and the command may be issued verbally by a user in a communication. For example, a user may speak into a communication device the phrase "hello everybody" thus the communication is the spoken phrase and the computer system may derive that the communication is to be sent to everybody. The computer system then relays the signal to everybody associated with the communication observation platform. In another example, the communication may be the phrase "hello Bob." The computer system derives that the destination of the communication is Bob; the communication is then relayed only to Bob.

The Table below shows examples of Communication Phrases and Derived Context information. Specific examples using sample vocabulary are given as well as more general cases indicated by the brackets [ ].

| Communication Phrase | Derived Context Information |
|---|---|
| "Hello Everybody" Hello [Group] | The communication is to be relayed to a group defined as "everybody" and anyone may respond. Context information such as "engaged" may limit those who hear and may respond to the "Hello" phrase. |
| "Hello Bob" Hello [Person] | The communication is to be relayed to an individual identified as "Bob" and only "Bob" hears the message and is able to respond. Context information such as "engaged" may result in the computer providing additional information to the caller such as the state of the user (e.g., "engaged") and other factors such as location. |
| "Hello Workshop" Hello [Location] | The communication is to be relayed to everyone associated with the "Workshop" location. Context information such as "engaged" may limit those who hear and may respond to the "Hello" phrase. |
| "Hello Process Experts" Hello [Group] | The communication is relayed to all identified as the group, "Process Experts." These people or machines may be physically located in any region or environment. Context information such as "engaged" may limit those who hear and may respond to the "Hello" phrase. |
| "Urgent Bob" or "Interrupt Bob" Interrupt [Person] Interrupt [Group] Interrupt [Location] | The communication is an urgent communication to be relayed to "Bob." Such a command may interrupt "Bob" if he is "engaged" or communicating with others or the system as defined by the operator of the environment. Once interrupted, communication is between the caller and original user (i.e., Bob) and may or may not include others who may have been talking with Bob at the time. |
| "Message Bob" Message [Person] Message [Group] Message [Location] | Leaves a message that persists for a predetermined interval. Messages for groups are heard as persons become available. Messages for locations are heard as persons become available or enter the location area. Special cases for 'messages" include delivering audio information to groups such as Marketing Departments, Buyers, Help Desks, Websites, Technical Support or Product improvement requests. |
| "Announcement Everybody" Announcement [Group] | The communication is to be relayed to "everyone" as a bulletin. Those users who are engaged or not yet on the system will hear the bulletin when they become available. |
| "Selling tip for the side hallway" Announcement [Location] | The communication is to be relayed to those who are within or enter the side hallway as an announcement. No response is anticipated. |
| "Absolute Announcement for Maintenance Team" Absolute Announcement [Group] or [Location] or [Person] | The communication is delivered to all who are available and in the proper context. A response is mandatory. The system records the time, location, user and spoken response for later analysis or storage. |
| "Where is Steve" Where is [Person] Where is [Group] | The communication is a command to determine a geographic location of Steve and to send a message back to the communication device from the computer system that speaks the response. The response may also include contextual information such as "Steve is available" or Steve is engaged" or other information from other sources such as "Steve is on break." Steve does not need to hear that his status was being probed, although it is possible to alert him. |
| "Who is near the central hallway" Who is near [Location] | The communication is a command to determine who is geographically located near the central hallway region and to send a message back to the communication device from the computer system that speaks the response. The response may include additional contextual information for the persons in that location. |
| "Go to simple menu" Command [profile] | The communication is a command for the computer system to go to the simple menu profile and to send a message back that speaks the phrase "you will now go to simple menu." This feature allows individual users to move into different command, control and skill level profiles within the system. |
| "Does anyone know if we have . . . ?" | Some formats of commands are natural to the users, but not is a structured speech |

| Communication Phrase | Derived Context Information |
|---|---|
| Spoken String | pattern. In this case, the words, "Does anyone know . . . " may trigger the computer to send this message to group of people who know where things are. Additional contextual information may limit that group to a department or location. |

The phrase "Go to simple menu" may be a command to enter a different menu structure for such activities as new-user learning, learning about products or business, listening to communications, or set-up functions such as group participation and default settings for the individual.

At 308, a geographic location of the first communication device is determined based on the second characteristic of the signal and at least one other source of information. For example, the at least one other source of information may be a router that the signal is routed through, a signal strength of the signal, information from the second communication device, etc.

At 310, a copy of at least one characteristic of the signal is stored in a storage medium and is made available for performance metric analysis. In one embodiment, the performance metrics are key performance metrics. At least one characteristic may be, but is not limited to, a time stamp, engaged, available status, a message, a voice file, a location, a signal signature, a type of message, text corresponding to a message, commands used to initiate the message, other contextual information about the user and an identity of the path the signal was routed through.

At 312, instructions are received at the computer system comprising rules for the relaying the signal to the destination derived from the context information. The rules may instruct to whom and to how the communication is to be relayed. For example, information derived from a communication may command that the communication be sent to everyone associated with the geographic location of "Workshop." However, the rules may instruct that the communication is only relayed to those associated with the "Workshop" who are designated as available or not busy. The rules may also comprise a predetermined time or a lifetime in which a response may be relayed to an available communication device.

At 314, the signal is relayed to a destination derived from the context information. The destination may be another user or a plurality of user or the computer system itself. The destination may be located outside of a radio range associated with the second communication device or be otherwise physically remote relative to the second communication device.

At 316, a data entry and visual representation is generated indicating the geographic position of the first communication device with respect to a geographic environment in which the first communication device is located. For example, the visual representation may be a map depicting the location of users or where users have been. The data entry and visual representation may include a status indicator of the user such as whether the user is busy or available.

FIG. 4 is a flowchart illustrating process 400 for using a structured communication in an observation platform in accordance with one embodiment of the present technology. In one embodiment, process 400 is a computer implemented method that is carried out by processors and electrical components under the control of computer usable and computer executable instructions. The computer usable and computer executable instructions reside, for example, in data storage features such as computer usable volatile and non-volatile memory. However, the computer usable and computer executable instructions may reside in any type of non-transitory computer usable storage medium. In one embodiment, process 400 is performed by the components of FIG. 1A, 1B, 1C or 2. In one embodiment, the methods may reside in a computer usable storage medium having instructions embodied therein that when executed cause a computer system to perform the method.

At 402, a signal from a first communication device is received at a second communication device, wherein a first characteristic of the signal corresponds to a voice of a first user and a second characteristic of the signal corresponds to information indicative of a geographic position of the first communication device. Additional characteristics of the signal may include contextual information and environmental information. For example, the audible source may be the voice of a user, the signal characteristics may include signal signature information and contextual/environmental information may include user status (e.g., engaged or on-break) and/or background noise levels.

At 404, the first user associated with the first communication device is recognized.

At 406, text or machine code related to the voice of the first user is recognized.

At 408, context information from the text or machine code is derived at a computer system associated with the second communication device, wherein the context information corresponds to a command related to the text or machine code.

At 410, the text or machine code is stored in a storage medium for developing performance metrics.

At 412, the signal is relayed to a destination derived from the context information. The destination may be located outside of a radio range associated with the second communication device or be otherwise physically remote relative to the second communication device.

FIG. 5 is a flowchart illustrating process 500 for observing and recording users of communication devices in accordance with one embodiment of the present technology. In one embodiment, process 500 is a computer implemented method that is carried out by processors and electrical components under the control of computer usable and computer executable instructions. The computer usable and computer executable instructions reside, for example, in data storage features such as computer usable volatile and non-volatile memory. However, the computer usable and computer executable instructions may reside in any type of non-transitory computer usable storage medium. In one embodiment, process 500 is performed by the components of FIG. 1A, 1B, 1C or 2. In one embodiment, the methods may reside in a computer usable storage medium having instructions embodied therein that when executed cause a computer system to perform the method.

In one embodiment, process 500 is a management observation tool for keeping track of mobile human resources and collecting data on their activities.

At 502, a first user associated with a first communication device and a second user associated with a second communication device are recognized at a central computer system.

At 504, geographic locations of the first communication device and the second communication device are tracked at the central computer system. In one embodiment, tracking means storing data about location and any spoken information.

At 506, a communication between the first communication device and the second communication device are tracked and recorded at the central computer system, wherein at least a portion of the communication is an audible communication.

At 508, features of the communication are identified at the central computer system. Features may be described as characteristics or data regarding the communication itself. The features may be user status such as engaged/available, location of a user, communication history of the user, context of the communication, keywords used in the communication, a classification of the communication, and time stamps.

At 510, the features are made available to a manager, operations staff or operations machines for making decisions or informing the users that new actions are requested.

FIG. 6 is a flowchart illustrating process 600 for characterizing communications in a group of users in accordance with one embodiment of the present technology. In one embodiment, process 600 is a computer implemented method that is carried out by processors and electrical components under the control of computer usable and computer executable instructions. The computer usable and computer executable instructions reside, for example, in data storage features such as computer usable volatile and non-volatile memory. However, the computer usable and computer executable instructions may reside in any type of non-transitory computer usable storage medium. In one embodiment, process 600 is performed by the components of FIG. 1A, 1B, 1C or 2. In one embodiment, the methods may reside in a computer usable storage medium having instructions embodied therein that when executed cause a computer system to perform the method.

At 602, a group of users is recognized, at a computer system, wherein each user of the group of users are associated with communication devices. The group of users may be recognized based on a classification of the user or a geographic location of the users. For example, a classification of the users may be whether the user is an associate or a customer in a retail setting.

At 604, a communication between the communication devices is recorded at the computer system, wherein at least a portion of the communication is an audible communication. In one embodiment, at least a portion of the communication is a pre-recorded audible communication.

At 606, geographic locations of the communication devices are recorded at the computer system. The location may be determined based on signal signatures or other "clues" from other devices sent periodically or with the communication indicative of the location.

At 608, features are identified based upon the communication. Features may be described as characteristic or data regarding the communication itself. The features may be a user status such as engaged/available, location of a user, communication history of the user, context of the communication, a classification of the communication, a frequency of communications between two users, a length of a communication, keywords used in the communication, a response time to a communication and time stamps.

At 610, a visual representation of the features is generated at the computer system. The visual representation may depict when a user of said group of users is engaged in said communication, when a user of said group of users asks a question in said communication, who responds to the question, where each user of said group of users are located, and where said group of users are not located. Alerts, either visual or verbal, may be generated depending on the rules established by the system operators.

At 612, the visual representation is made available to a manager, operations staff or operations machines for making decisions or informing the users that new actions are requested.

FIG. 7 is a flowchart illustrating process 700 for using structured communication in a plurality of observation platforms in accordance with one embodiment of the present technology. Process 700 may also be described as disciplining communications in an observation platform. In one embodiment, process 700 is a computer implemented method that is carried out by processors and electrical components under the control of computer usable and computer executable instructions. The computer usable and computer executable instructions reside, for example, in data storage features such as computer usable volatile and non-volatile memory. However, the computer usable and computer executable instructions may reside in any type of non-transitory computer usable storage medium. In one embodiment, process 700 is performed by the components of FIG. 1A, 1B, 1C or 2. In one embodiment, the methods may reside in a computer usable storage medium having instructions embodied therein that when executed cause a computer system to perform the method.

At 702, a signal in a first observation platform is received from a first communication device at a second communication device associated with a computer system wherein a first characteristic of the signal corresponds to an audible source and a second characteristic of the signal corresponds to information indicative of a geographic position of the first communication device, and wherein the second observation platform is associated with a radio range. Additional characteristics of the signal may include contextual information and environmental information. For example, the audible source may be the voice of a user, the signal characteristics may include signal signature information and contextual/environmental information may include user status (e.g., engaged or on-break) and/or background noise levels.

At 704, a first user associated with the first communication device is recognized at the computer system.

At 706, context information for the signal is derived at the computer system associated with the second communication device. The context information may be geographic information, data regarding length or time of communication, or text of the communication. In one embodiment, speech to text recognition techniques are employed to covert an audible communication to text. In one embodiment, the context information is a command for the computer system to perform. In one embodiment, the signal is encrypted or encoded uniquely with respect to the first communication device. The context information may be a command to the computer system. For example the computer system may be commanded to access a database in response to a query.

At 708, the signal is relayed from the computer system to a second computer system associated with a second observation platform via a computer network At 710, the signal is relayed to a destination in the second observation platform via the second computer system derived from said context information.

FIG. 8 is a flowchart illustrating process 800 for performing structured communications in an observation platform in accordance with one embodiment of the present technology. Process 800 may also be described as disciplining communications in an observation platform. In one embodiment, process 800 is a computer implemented method that is carried out by processors and electrical components under the control of computer usable and computer executable instructions. The computer usable and computer executable instructions reside, for example, in data storage features such as computer usable volatile and non-volatile memory. However, the computer usable and computer executable instructions may reside in any type of non-transitory computer usable storage medium. In one embodiment, process 800 is performed by the components of FIG. 1A, 1B, 1C or 2. In one embodiment, the methods may reside in a computer usable storage medium having instructions embodied therein that when executed cause a computer system to perform the method.

At 802, a signal is received from a first communication device at a second communication device associated with a computer system, wherein the computer system is associated with an organization, wherein a first characteristic of the signal corresponds to an audible source and a second characteristic of the signal corresponds to information indicative of a geographic position of the first communication device. Additional characteristics of the signal may include contextual information and environmental information. For example, the audible source may be the voice of a user, the signal characteristics may include signal signature information and contextual or environmental information may include user status (e.g., engaged or on-break) and/or background noise levels. The organization may be a retail environment, a school, an event, a military organization, a prison organization, customer service, manufacturing organization, a factory, a disaster response team, or any environment where humans interact with one another to accomplish a purpose. The first communication device may be a handheld device that is capable of sending and receiving signals and may comprise a display, a microphone and a speaker. The first communication device may be owned by the organization and issued to the user or may be the user's personal property such as a smart phone executing an application. The second communication device may be a radio base station as described herein.

At 804, a user is identified as associated with the first communication device at the computer system. In one embodiment, 804 only identifies that there is a user employing the communication device. The actual identity of the user may remain anonymous to the computer system or the user may be identified. The user may be identified using one or a combination of several different techniques. The user may be identified via a unique signature of the communication device associated with the user. For example, the user's communication device may be a smart phone running an application. The smart phone may be the user's personal property and is always associated with the user. In one embodiment, the user may be authenticated upon activation of the communication device or the application. For example, a user may enter an environment, activate a communication device and then give user credentials that identify the user. This may accomplished via voice commands or text inputs. In one embodiment, the user credentials are associated with a user profile, but the actual identity of the user remains anonymous. In one embodiment, the user may activate a communication device and self-identify. Identifying a user may be automatic taking place without the user's knowledge, or may require the user to acknowledge or give permission for the computer system to identify the user.

At 806, the audible source of the signal is converted to text or machine understandable language at the computer system. This may occur using speech-to-text techniques or other techniques employed by computer systems.

At 808, a query related to the organization is derived based on the text or understanding at the computer system. The query may be any number of queries from the user. The user may ask for general assistance or may ask a more specific question such as whether an item is in stock, where an item is located, what sales are taking place, technical details or features regarding an item.

At 810, a response to the query is compiled at the computer system, wherein the response represents the organization. For example, the response relates to the purpose of the organization. In one embodiment, the response is regarding a location or status of a person or an item within the organization. The computer system may access a database to complete the response. The database maybe a local database such as an inventory of a local store, or may access a database in part of a larger network associated with the organization, or may access a database associated with the Internet. In one embodiment, the computer system performs a key word search of the Internet using a search engine to complete the response.

At 812, the response is sent to the first communication device, wherein the response is audible at the first communication device. In one embodiment, the response is initially a text response that is converted from text to speech. The conversion may occur at the computer system such that a signal with an audible portion is sent to the first communication device, or a text message may be sent to the first communication device where it is converted to speech. The response may be recorded by the organization in a computer system and may also be sent to a person associated with the organization such as a manager or associated. Thus, a person associated with the business may monitor the responses of the computer system and may be aware of the needs or requirements of the user associated with the first communication device.

At 814, a prior user history of the user is associated with the first communication device. The user history may be a user profile that may or may not identify the user. The history may have a list of all the transactions of this user associated with the organization. The history may also comprise information provided by the user such as likes and dislikes or preferences regarding which person the user wishes to be served by while in the organization.

At 816, the signal and the response are relayed to a third communication device associated with a person representing the organization. The person associated with the organization may be a consultant, an employee, an associate, a sales associate, a civil servant, a volunteer or a manager. The third communication device may be a handheld device and may or may not be the same type of device as the first communication device.

At 818, a second response is received at the second communication device from the third communication device. For example, the person representing the organization may respond using a signal that may have an audible voice portion a text portion or both.

At 820, the second response is relayed to the first communication device. The computer system may initiate a virtual voice connection between the first communication device and the second communication device.

Figure 9:
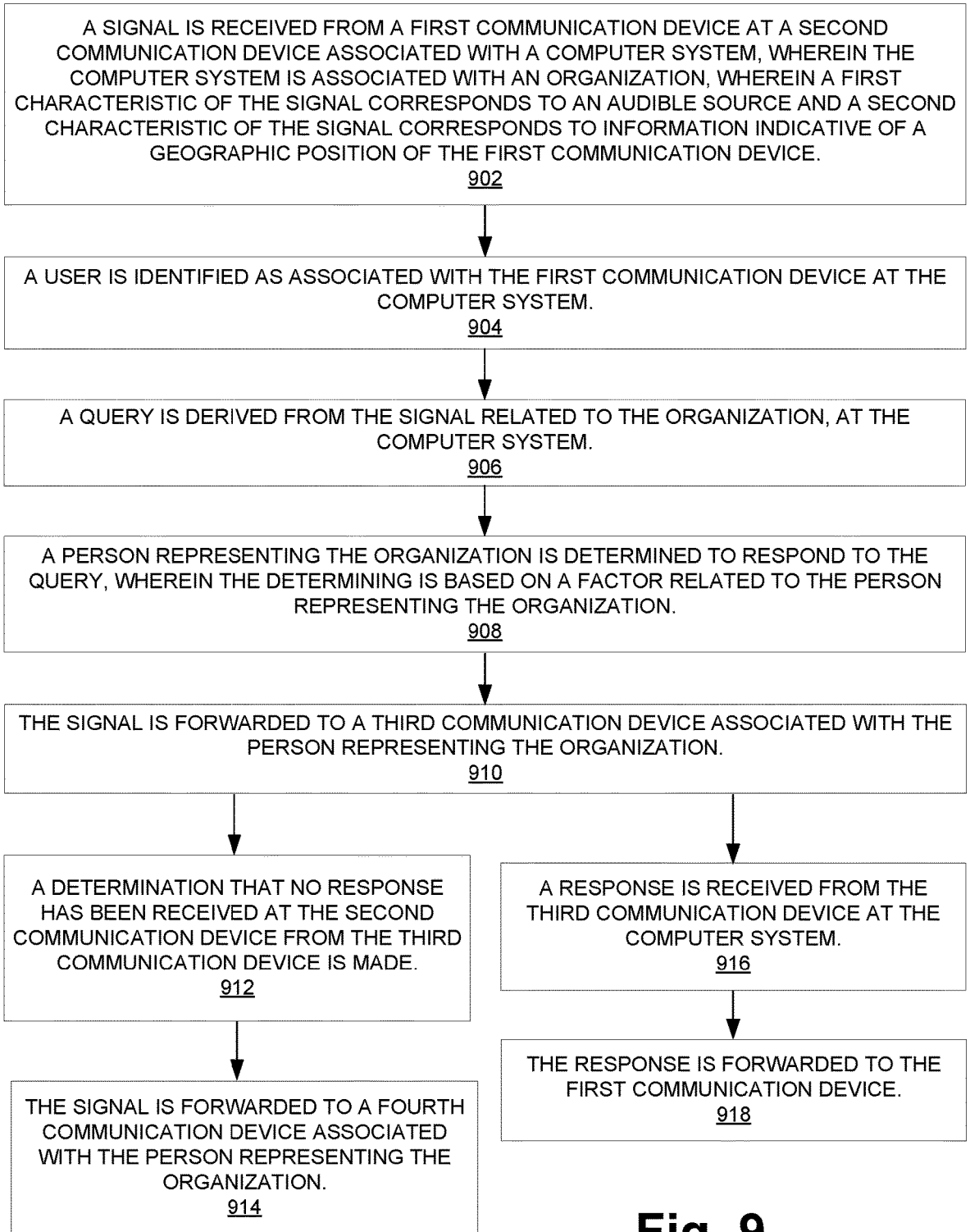
FIG. 9 illustrates a flowchart of an example method for performing communications in an of observation platforms in accordance with embodiments of the present technology.

FIG. 9 is a flowchart illustrating process 900 for performing structured communications in an observation platform in accordance with one embodiment of the present technology. Process 900 may also be described as disciplining communications in an observation platform. In one embodiment, process 900 is a computer implemented method that is carried out by processors and electrical components under the control of computer usable and computer executable instructions. The computer usable and computer executable instructions reside, for example, in data storage features such as computer usable volatile and non-volatile memory. However, the computer usable and computer executable instructions may reside in any type of non-transitory computer usable storage medium. In one embodiment, process 900 is performed by the components of FIG. 1A, 1B, 1C or 2. In one embodiment, the methods may reside in a computer usable storage medium having instructions embodied therein that when executed cause a computer system to perform the method.

At 902, a signal is received from a first communication device at a second communication device associated with a computer system, wherein the computer system is associated with an organization, wherein a first characteristic of the signal corresponds to an audible source and a second characteristic of the signal corresponds to information indicative of a geographic position of the first communication device. Additional characteristics of the signal may include contextual information and environmental information. For example, the audible source may the voice of a user, the signal characteristics may include signal signature information and contextual or environmental information may include user status (e.g., engaged or on-break) and/or background noise levels. The organization may be a retail environment, a school, an event, a military organization, a prison organization, customer service, manufacturing organization, a factory, a disaster response team, or any environment where humans interact with one another to accomplish a purpose. The first communication device may be a handheld device that is capable of sending and receiving signals and may comprise a display, a microphone and a speaker. The first communication device may be owned by the organization and issued to the user or may be the user's personal property such as a smart phone executing an application. The second communication device may be a radio base station as described herein.

At 904, a user is identified as associated with the first communication device at the computer system. The actual identity of the user may remain anonymous to the computer system or the user may be identified. The user may be identified using one or a combination of several different techniques.

At 906, a query is derived from the signal of the first device related to the organization, at the computer system. The query may be any number of queries from the user. The user may ask for general assistance or may ask a more specific question such as whether an item is in stock, where an item is located, what sales are taking place, technical details or features regarding an item or requesting general assistance.

At 908, a person representing the organization is determined to respond to the query, wherein the determining is based on a factor related to the person representing the organization. The factor may also be described as a characteristic. The factor may be related to the query from the user. For example, the user may ask a question regarding an item in a given department. The determining may be based on who is associated with the given department. The factor may also be based on the status of the person, the availability of the person, the proximity of the person to the user, geographic location of the person, knowledge level of the person, authority level of the person, ability of the person, or a combination of factors. The determining may determine that a plurality of persons qualify to respond. The signal may then be forwarded to one of the plurality, a subset of the plurality, or all of the plurality of persons.

At 910, the signal is forwarded to a third communication device associated with the person representing the organization.

At 912, a determination that no response has been received at the second communication device from the third communication device is made. 912 may occur after 910 in an embodiment where 916 and 918 do not occur. However, 912, 914, 916 and 918 may all occur in one embodiment. Such determination may occur after a pre-determined time period has passed with no response from the third communication device. Such a determination may or may not preclude the third communications device from later responding.

At 914, the signal is forwarded to a fourth communication device associated with the person representing the organization. 912 and 914 may be repeated forwarding the signal to additional communication devices until it is determined that a person representing the organization has responded via a communication device. Alternatively, 910 and 914 may forward the signal to a plurality of communication devices associated with a plurality of persons representing the organization. Once any one of the plurality of persons responds, the person and the user may be placed into a communications channel via their communications devices. The communications channel may be private in the sense that the other members of the plurality of persons representing the organization do not hear subsequent communications over the communications channel. This may be accomplished via the computer system associated with the second communications device. The subsequent communications may all be relayed or forwarded between the user and the person representing the organization via the second communication device and the associated computer system. In one embodiment, the communication channel is open to all members of the plurality of persons representing the organization. In one embodiment, the communication channel is open to a subset group of the plurality of persons representing the organization. For example, the subset group may be only persons who are determined by the computer system to have knowledge regarding the query made by the user or may only be persons who are determined to be available, or persons who have interest in learning more about the subject, or some combination of these characteristics.

By forwarding the signal to a fourth communication device or a plurality of other devices, the circle or group of those required or enlisted to help the user is enlarged. In other words, the user may send a communication or query indicating that the user is in need of assistance. The computer system determines a first person is to assist the user, but if the first person doesn't respond, the computer system then determines a second person or a plurality of persons to assist the user. Thus the group of those responding to the assistance need increases. In one embodiment, the initial communication from the first user may go to a designated plurality and the first person to respond becomes established in a private one-on-one conversation with the first (originating) user.

At 916, a response is received from the third communication device at the computer system. 916 may occur after 910 in an embodiment where 912 and 914 do not occur.

At 918, the response is forwarded to the first communication device. 918 may occur after 916 in an embodiment where 912 and 914 do not occur. Process 900 may initiate a virtual voice connection between two communication devices where the communication is relayed or forwarded via the computer system and the second communication device. Thus the computer system and the second communication device may be described as mediating the communications.

Figure 10:
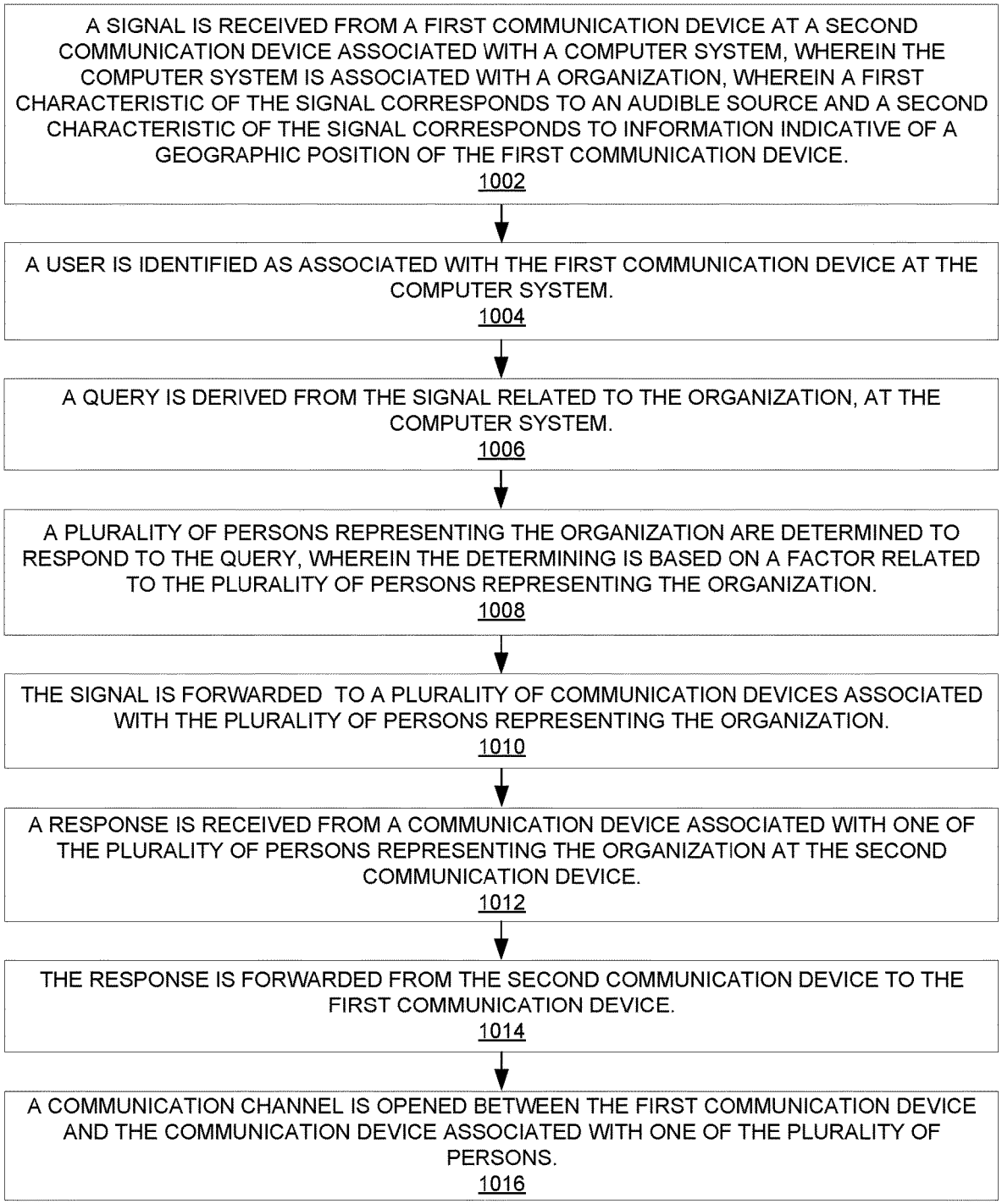
FIG. 10 illustrates a flowchart of an example method for performing communications in an of observation platforms in accordance with embodiments of the present technology.

FIG. 10 is a flowchart illustrating process 1000 for performing structured communications in an observation platform in accordance with one embodiment of the present technology. Process 1000 may also be described as disciplining communications in an observation platform. In one embodiment, process 1000 is a computer implemented method that is carried out by processors and electrical components under the control of computer usable and computer executable instructions. The computer usable and computer executable instructions reside, for example, in data storage features such as computer usable volatile and non-volatile memory. However, the computer usable and computer executable instructions may reside in any type of non-transitory computer usable storage medium. In one embodiment, process 1000 is performed by the components of FIG. 1A, 1B, 1C or 2. In one embodiment, the methods may reside in a computer usable storage medium having instructions embodied therein that when executed cause a computer system to perform the method.

At 1002, a signal is received from a first communication device at a second communication device associated with a computer system, wherein the computer system is associated with an organization, wherein a first characteristic of the signal corresponds to an audible source and a second characteristic of the signal corresponds to information indicative of a geographic position of the first communication device. Additional characteristics of the signal may include contextual information and environmental information. For example, the audible source may the voice of a user, the signal characteristics may include signal signature information and contextual or environmental information may include user status (e.g., engaged or on-break) and/or background noise levels. The organization may be a retail environment, a school, an event, a military organization, a prison organization, customer service, manufacturing organization, a factory, a disaster response team, or any environment where humans interact with one another to accomplish a purpose. The first communication device may be a handheld device that is capable of sending and receiving signals and may comprise a display, a microphone and a speaker. The first communication device may be owned by the organization and issued to the user or may be the user's personal property such as a smart phone executing an application. The second communication device may be a radio base station as described herein.

At 1004, a user is identified as associated with the first communication device at the computer system. The actual identity of the user may remain anonymous to the computer system or the user may be identified. The user may be identified using one or a combination of several different techniques.

At 1006, a query is derived from the signal related to the organization, at the computer system. The query may be any number of queries from the user. The user may ask for general assistance or may ask a more specific question such as whether an item is in stock, where an item is located, what sales are taking place, technical details or features regarding an item.

At 1008, a plurality of persons representing the organization are determined to respond to the query, wherein the determining is based on a factor related to the plurality of persons representing the organization.

At 1010, the signal is forwarded to a plurality of communication devices associated with the plurality of persons representing the organization. Such a series of communications may be described as a one-to-many communication. The "many" group may be default or predefined group such as all those associated with a given department or all those who are associated with a given area of expertise. Groups may also be created based on names, locations, availability or status.

At 1012, a response is received from a communication device associated with one of the plurality of persons representing the organization at the second communication device.

At 1014, the response is forwarded from the second communication device to the first communication device. Thus the communication may go from a one-to-many to a one-to-one communication.

At 1016, a communication channel is opened between the first communication device and the communication device associated with one of the plurality of persons. In other words, the communication from the first (originating) user is sent to multiple persons. The first person to respond enters into a communication channel between the first communication device and the communication device associated the person. Others who respond within a pre-determined timeframe are also included in the "channel." The communication channel may be mediated by the computer system and once all users have entered, may not be overheard by the other persons from the plurality of persons. The usefulness of this structure is that it allows ad-hoc group construction by simply announcing the intent of the group, and only those responding are tied into the private group "channel".

In one embodiment, the communication may go from a one-to-many to a one-to-few communication. The persons in the few of the one-to-few communication may be a subset of the many persons from the one-to-many. For example, the initial communication may be sent to all those persons holding communication devices. The computer system may then open a communication channel between the first person to respond where the channel is also opened to others person representing the store who are associated with a specific role or department. Thus only one person may be actively communicating with the user, but other persons may hear the communications and may join at any time. Thus the communication may not disrupt those who are otherwise not interested.

FIG. 11 is a flowchart illustrating process 1100 for sending notifications in an observation platform in accordance with one embodiment of the present technology. Process 1100 may also be described as disciplining communications in an observation platform. In one embodiment, process 1100 is a computer implemented method that is carried out by processors and electrical components under the control of computer usable and computer executable instructions. The computer usable and computer executable instructions reside, for example, in data storage features such as computer usable volatile and non-volatile memory. However, the computer usable and computer executable instructions may reside in any type of non-transitory computer usable storage medium. In one embodiment, process 1100 is performed by the components of FIG. 1A, 1B, 1C or 2. In one embodiment, the methods may reside in a computer usable storage medium having instructions embodied therein that when executed cause a computer system to perform the method.

At 1102, a signal is received from a first communication device at a second communication device associated with a computer system, wherein the computer system is associated with an organization, wherein a first characteristic of the signal corresponds to information indicative of a geographic position of the first communication device. The organization may be a retail environment, a school, an event, a military organization, a prison organization, customer service, manufacturing organization, a factory, a disaster response team, or any environment where humans interact with one another to accomplish a purpose. The first communication device may be a handheld device that is capable of sending and receiving signals and may comprise a display, a microphone and a speaker. The first communication device may be owned by the organization and issued to the user or may be the user's personal property such as a smart phone executing an application. The second communication device may be a radio base station as described herein.

At 1104, a user is identified as associated with the first communication device at the computer system. The actual identity of the user may remain anonymous to the computer system or the user may be identified. The user may be identified using one or a combination of several different techniques.

At 1106, a history of activities of the user associated with the organization is accessed. The history of activities may be a user history or user profile that may or may not identify the user. The history may have a list of all the transactions of this user associated with the organization. The history may also comprise information provided by the user such as likes and dislikes or preferences regarding which person the user wishes to be served by while in the organization. The computer may attempt to find the preferential associate(s) and notify them that the shopper is in the store and where they are located. The associates contacted may hear prior conversations with that shopper to refresh their memory and aid in making the shopper experience seamless.

At 1108, a geographic location of the first communication device in the organization is derived at the computer system. For example, the computer system may determine that the user is on a given aisle such as the cereal aisle in a grocery store or in a zone that may correlate to a department such as the lumber department in a hardware store.

At 1110, a notification is sent to the first communication device wherein the notification is based on the history of activity and the geographic location of the first communication device. For example, the notification may alert the user of a coupon or special on a given item in the organization that is for sale. The coupon or special may be for an item that the user previously purchased which knowledge was obtained by the computer system based on the history of user activity. The notification maybe any number of notifications including a text message or an audible message and the notification may be accompanied by an alert such as a vibration or an audible sound. The history of activity may be utilized to automatically connect communications from the user to a person with whom the user has prior interactions.

At 1112, at least a portion of the history of activities is delivered to the first communication device. Such information may be used the user to determine what items the user previously purchased. For example, the user may wish to purchase the same item again but does not remember the exact details of the item or the user may wish to avoid purchasing the same item. The user may also use the information to identify a person representing the organization with whom the user wishes to interact with again. For example, the user may have had a pleasant experience with a given sales associate and know that sales associate can meet the user's needs. In one embodiment, step 1112 is not performed as part of process 1100.

Process 1100 may be used in conjunction with a loyalty program involving lotteries or coupons that may be in existence before the communications platform is implemented in the organization or may be created based on the communications platform or a combination of the two.

FIG. 12 is a flowchart illustrating process 1200 for performing structured communications in an observation platform in accordance with one embodiment of the present technology. Process 1200 may also be described as disciplining communications in an observation platform. In one embodiment, process 1200 is a computer implemented method that is carried out by processors and electrical components under the control of computer usable and computer executable instructions. The computer usable and computer executable instructions reside, for example, in data storage features such as computer usable volatile and non-volatile memory. However, the computer usable and computer executable instructions may reside in any type of non-transitory computer usable storage medium. In one embodiment, process 1200 is performed by the components of FIG. 1A, 1B, 1C or 2. In one embodiment, the methods may reside in a computer usable storage medium having instructions embodied therein that when executed cause a computer system to perform the method.

At 1202, a signal is received from a first communication device at a second communication device associated with a computer system, wherein the signal comprises a mandatory message for a third communication device. For example, the mandatory message may be a message that is required to be delivered to each employ associated with an organization and an acknowledgement received and recorded. The requirement may be a legal requirement to notify employees of certain information or may be requirement implemented by the organization. The mandatory message may be delivered as an audible message or a text message. The mandatory message may also direct a user to a location where more information may be found.

At 1204, the signal is forwarded with the mandatory message to the third communication device associated with a user such that a receipt of the mandatory message at the third communication device will lock features of the third communication device until the mandatory message has been acknowledged by the user. For example, the third communication device may be a handheld device and may have features such as the ability to communicate with other devices or the ability to connect to other devices such as a computer system and may be used to access information from a database. Upon receipt of the mandatory message, some or all of the features of the communication device may be locked meaning that the user not able to access the features. For example, upon receipt of the mandatory message the communication device may lock or disable the ability to communicate with other devices.

At 1206, an acknowledgement of the mandatory message is received from the third communication device at the second communication device. The acknowledgement may be generated manually by the user of the third communication device or may be automatically generated. For example, upon receipt of the mandatory message, the third communication device may display an option to access the mandatory message. Once the user accesses the message, the acknowledgement may be sent automatically, or an option may be presented to the user to send the message. In one embodiment, the user is required to create an acknowledgement message to send back. The acknowledgement message may be a text or audible message created by the user.

At 1208, the acknowledgement of the mandatory message is forwarded from the second communication device to the first communication device. In one embodiment, the locked features of the third communication device may be unlocked in response to the user accessing the mandatory message. In one embodiment, the locked features of the third communication device may be unlocked in response the computer system receiving the acknowledgement. In one embodiment, the locked features of the third communication device may be unlocked in response to the user of the first communication device receiving the acknowledgement.

At 1210, the signal with the mandatory message is forwarded to a plurality of communication devices associated with a plurality of users such that a receipt of the mandatory message at each of the plurality of communication devices will lock features of each of the plurality of communication devices until the mandatory message has been acknowledged by each of the plurality of users.

At 1212, a characteristic of the forwarding the signal with the mandatory message is tracked. In one embodiment, the system tracks the time the message was sent, when it was heard by the user, and when and where the user was located when they acknowledged. Associated with the statistical information is a speech file of what the user said. This feature is ideal for communicating policy or liability information and assuring that that information was received and understood. It should be appreciated that there is more than one type or class of mandatory messages. Each type or class may have different requirements for the delivery and/or acknowledgement.

It should be appreciated that processes 300, 400, 500, 600, 700, 800, 900, 1000, 1100 and 1200 need not carry out each of the described steps to complete its operation. Nor do the steps need to be carried out in the order described. It should be appreciated that processes 300, 400, 500, 600, 700, 800, 900, 1000, 1100 and 1200, or portions thereof, may be combined with one another using any number of combination. For example, the response from the computer system in process 800 may take place in 900, 1000, 1100 and 1200.

FIG. 14 is a flowchart illustrating process 1400 for managing and distributing content in a plurality of observation platforms in accordance with one embodiment of the present technology. In one embodiment, process 1400 is a computer implemented method that is carried out by processors and electrical components under the control of computer usable and computer executable instructions. The computer usable and computer executable instructions reside, for example, in data storage features such as computer usable volatile and non-volatile memory. However, the computer usable and computer executable instructions may reside in any type of non-transitory computer usable storage medium. In one embodiment, process 1400 is performed by the components of FIG. 1A, 1B, 1C, 2, or 13. In one embodiment, the methods may reside in a non-transitory computer usable storage medium having instructions embodied therein that when executed cause a computer system to perform the method.

At 1402, a message is generated with content at a content distribution manager. The content may be pre-recorded or generated and accessed by the content distribution manager or may be generated as new original content. In one embodiment, the content is an audible voice recording stored in an electronic format such as a WAV file. The content distribution manager may be accessed by a computer system via a URL and comprise an API.

At 1404, a delivery of the message is scheduled and a plurality of specified devices are specified for delivery in a plurality of observation platforms at a designated time via the content distribution manager, wherein the plurality of observation platforms are capable of receiving a signal from a first mobile device with a first characteristic that corresponds to an audible source and a second characteristic that corresponds to information indicative of a geographic position of the first mobile device and relaying the signal to a destination based on the first characteristic and/or the second characteristic. The message may be scheduled for immediate delivery such the message is delivered immediately after it is received or immediately after it is scheduled for delivery.

The user of the content distribution manager may designate a time to deliver the message, how long the message should be available, and which devices in which observation platforms to deliver the message to. The message may be delivered to different devices simultaneously or at different designated times.

The user of the content distribution managers may specify which devices receive the message based on groupings defined by context information (Process 700), rules or policy information (Process 300), historical information (Process 1100) or manual groupings of individuals who are identified by the system.

At 1406, the message is delivered to the plurality of observation platforms which relays the message to the plurality of specified devices at the designated time. Cloud services 1316 of FIG. 13 may employ message scheduler 1322 and message broker 1324 for such delivery. Once the device has received the message, the device may notify the user that a message has been received using a light or sound or other notification technique. In one embodiment, the message is immediately delivered.

At 1408, a confirmation is received at the content distribution manager that the message has been delivered to one of the plurality of specified devices.

At 1410, a confirmation is received at the content distribution manager that the message has been played at one of the plurality of specified devices. 1408 and 1410 may be associated with mandatory messages as described herein.

FIG. 15 is a flowchart illustrating process 1500 for managing a plurality of observation platforms via a manager application in accordance with one embodiment of the present technology. In one embodiment, process 1500 is a computer implemented method that is carried out by processors and electrical components under the control of computer usable and computer executable instructions. The computer usable and computer executable instructions reside, for example, in data storage features such as computer usable volatile and non-volatile memory. However, the computer usable and computer executable instructions may reside in any type of non-transitory computer usable storage medium. In one embodiment, process 1500 is performed by the components of FIG. 1A, 1B, 1C, 2, or 13. In one embodiment, the methods may reside in a non-transitory computer usable storage medium having instructions embodied therein that when executed cause a computer system to perform the method.

At 1502, one observation platform of a plurality of observation platforms is accessed via a manager application at a mobile device comprising a processor, memory, and a network interface card, wherein the plurality of observation platforms are capable of receiving a signal from a first mobile device with a first characteristic that corresponds to an audible source and a second characteristic that corresponds to information indicative of a geographic position of the first mobile device and relaying the signal to a destination based on the first characteristic and/or the second characteristic. The mobile device may be a mobile computer system such as a smart phone or a tablet computer. The manager application may be an app designed specifically for the type of device. The device may execute a specific operating system such as an Android operating system or an iOS operating system.

At 1504, monitoring statistics are displayed of the one observation platform corresponding to devices associated with the observation platform. The manager application may be able to access monitoring statistics for a plurality of observation platforms.

At 1506, a message is received at the manager application from a user of the mobile device.

At 1508, the message is relayed to specified devices in the one observation platform from the manager application, wherein the specified devices are specified by the user via the mobile device and the manager application. 1506 and 1508 may be managed using techniques similar to what is described for messages in regards to content distribution manager browser 1304 of FIG. 13 and/or the context based techniques described in Processes 700 and 900.

At 1510, a confirmation is received at the manager application that the message has been delivered to at least one of the specified devices.

In one embodiment, process 1500 is used only to send and receive messages and does not include monitoring steps such as 1504. In one embodiment, process 1500 is used only for monitoring steps such as 1504 and does not send and receive messages such as steps 1506, 1508, and 1510.

Example Computer System Environment

Portions of the present technology are composed of computer-readable and computer-executable instructions that reside, for example, in computer-usable media of a computer system or other user device. Described below is an example computer system or components that may be used for or in conjunction with aspects of the present technology.

It is appreciated that that the present technology can operate on or within a number of different computer systems including general purpose networked computer systems, embedded computer systems, cloud-based computers, routers, switches, server devices, user devices, various intermediate devices/artifacts, stand-alone computer systems, mobile phones, personal data assistants, televisions and the like. The computer system is well adapted to having peripheral computer readable media such as, for example, a floppy disk, a compact disc, and the like coupled thereto.

The computer system includes an address/data bus for communicating information, and a processor coupled to bus for processing information and instructions. The computer system is also well suited to a multi-processor or single processor environment and also includes data storage features such as a computer usable volatile memory, e.g. random access memory (RAM), coupled to bus for storing information and instructions for processor(s).

The computer system may also include computer usable non-volatile memory, e.g. read only memory (ROM), as well as input devices such as an alpha-numeric input device, a mouse, or other commonly used input devices. The computer system may also include a display such as liquid crystal device, cathode ray tube, plasma display, and other output components such as a printer or other common output devices.

The computer system may also include one or more signal generating and receiving device(s) coupled with a bus for enabling the system to interface with other electronic devices and computer systems. Signal generating and receiving device(s) of the present embodiment may include wired serial adaptors, modems, and network adaptors, wireless modems, and wireless network adaptors, and other such communication technology. The signal generating and receiving device(s) may work in conjunction with one or more communication interface(s) for coupling information to and/or from the computer system. A communication interface may include a serial port, parallel port, Universal Serial Bus (USB), Ethernet port, antenna, or other input/output interface. A communication interface may physically, electrically, optically, or wirelessly (e.g. via radio frequency) couple the computer system with another device, such as a cellular telephone, radio, a handheld device, a smartphone, or computer system.

Although the subject matter is described in a language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed:

1. A method for managing and distributing content in a plurality of observation platforms, comprising:
    responsive to user interactions with a cloud based component of a content distribution manager via an interface of said content distribution manager presented on a computer system, generating a message at said cloud based component of said content distribution manager, wherein said content comprises one of audio recorded as speech and audio derived from textual language converted to spoken language;
    responsive to said user interactions and to interactions of third party software via an application program interface with said cloud based component of said content distribution manager, scheduling delivery of said message and specifying a plurality of specified devices belonging to a specified class of employees for delivery in a plurality of observation platforms at a designated time and a designated location via said cloud based component of said content distribution manager, wherein said plurality of observation platforms are located in a plurality of different enterprise locations where said specified class of employees work, wherein said plurality of observation platforms are configured to receive a signal from a first mobile device with a characteristic that corresponds to an audible source, and wherein said plurality of observation platforms are further configured to relay said signal to a destination based on said characteristic; and
    delivering and measuring the delivery and response to said message to said plurality of observation platforms which relay said message to said plurality of specified devices at said designated time and said designated location.

2. The method as recited in claim 1, wherein said computer system is further responsive to second user interactions made via a support manager application running on one of a desktop computer system, a mobile computer system, and a smartphone.

3. The method as recited in claim 2, further comprising:
receiving, by the support manager application, the second user interactions while the support manager application is physically remote from the plurality of observation platforms.

4. The method as recited in claim 2, further comprising:
performing, by the support manager application, at least one of gathering, visually representing, and reporting system performance metrics obtained by the support manager application from one or more of the plurality of observation platforms.

5. The method as recited in claim 2, further comprising:
observing, by the support manager application, who is talking with whom within the plurality of observation platforms.

6. The method as recited in claim 5, further comprising:
enabling, by the support manager application, a user to hear one of selected communications occurring within one or more of the plurality of observations platforms and all communications occurring within one or more of the observation platforms.

7. The method as recited in claim 2, further comprising:
determining, by the support manager application, trends via a real-time summary of one of performance and user activities.

8. The method as recited in claim 2, further comprising:
generating, by the support manager application, alarms in response to a real-time summary of one of performance and user activities.

9. The method as recited in claim 2, further comprising:
responding, by the support manager application, in real-time using one or more of spoken responses and playing messages.

10. The method as recited in claim 2, further comprising:
tracking, by the support manager application, all devices within one or more of the plurality of observation platforms.

11. The method as recited in claim 2, further comprising:
tracking, by the support manager application, technical details for one or more of devices in said observation platforms, wherein the technical details are selected from the list of technical details consisting of: a battery state, a charged state, a user volume setting, a connection point being used, a location within physical boundaries of an observation platform of the observation platforms, and environmental noise and sounds.

12. The method as recited in claim 2, further comprising:
mining, by the support manager application, a database for detection of anomalies and creation of alarms.

13. The method as recited in claim 1, wherein said computer system is further responsive to second user interactions made via a log-on application running on a computing device and accessed via a web browser communicatively coupled with a uniform resource locator.

14. A non-transitory computer-usable storage medium having instructions embodied therein that when executed cause a computer system to perform a method for managing and distributing content in a plurality of observation platforms, said method comprising:
responsive to user interactions with a cloud based component of a content distribution manager via an interface of said content distribution manager presented on a computer system, generating a message at said cloud based component of said content distribution manager, wherein said content comprises one of audio recorded as speech and audio derived from textual language converted to spoken language;
responsive to said user interactions and to interactions of third party software via an application program interface with said cloud based component of said content distribution manager, scheduling delivery of said message and specifying a plurality of specified devices belonging to a specified class of employees for delivery in a plurality of observation platforms at a designated time and a designated location via said cloud based component of said content distribution manager, wherein said plurality of observation platforms are located in a plurality of different enterprise locations where said specified class of employees work, wherein said plurality of observation platforms are configured to receive a signal from a first mobile device with a characteristic that corresponds to an audible source, and wherein said plurality of observation platforms are further configured to relay said signal to a destination based on said characteristic; and
delivering and measuring the delivery and response to said message to said plurality of observation platforms which relay said message to said plurality of specified devices at said designated time and said designated location.

15. The non-transitory computer-usable storage medium as recited in claim 14, wherein said computer system is further responsive to second user interactions made via a support manager application running on one of a desktop computer system, a mobile computer system, and a smartphone.

16. The non-transitory computer-usable storage medium as recited in claim 15, further comprising:
receiving, by the support manager application, the second user interactions while the support manager application is physically remote from the plurality of observation platforms.

17. The non-transitory computer-usable storage medium as recited in claim 15, further comprising:
performing, by the support manager application, at least one of gathering, visually representing, and reporting system performance metrics obtained by the support manager application from one or more of the plurality of observation platforms.

18. The non-transitory computer-usable storage medium as recited in claim 15, further comprising:
observing, by the support manager application, who is talking with whom within the plurality of observation platforms.

19. The non-transitory computer-usable storage medium as recited in claim 18, further comprising:
enabling, by the support manager application, a user to hear one of selected communications occurring within one or more of the plurality of observations platforms and all communications occurring within one or more of the observation platforms.

20. The non-transitory computer-usable storage medium as recited in claim 15, further comprising:
determining, by the support manager application, trends via a real-time summary of one of performance and user activities.

21. The non-transitory computer-usable storage medium as recited in claim 15, further comprising:
generating, by the support manager application, alarms in response to a real-time summary of one of performance and user activities.

22. The non-transitory computer-usable storage medium as recited in claim 15, further comprising:
responding, by the support manager application, in real-time using one or more of spoken responses and playing messages.

23. The non-transitory computer-usable storage medium as recited in claim 15, further comprising:
tracking, by the support manager application, all devices within one or more of the plurality of observation platforms.

24. The non-transitory computer-usable storage medium as recited in claim 15, further comprising:
tracking, by the support manager application, technical details for one or more of devices in said observation platforms, wherein the technical details are selected from the list of technical details consisting of: a battery state, a charged state, a user volume setting, a connection point being used, a location within physical boundaries of an observation platform of the observation platforms, and environmental noise and sounds.

25. The non-transitory computer-usable storage medium as recited in claim 15, further comprising:
mining, by the support manager application, a database for detection of anomalies and creation of alarms.

26. The non-transitory computer-usable storage medium as recited in claim 14, wherein said computer system is further responsive to second user interactions made via a log-on application running on a computing device and accessed via a web browser communicatively coupled with a uniform resource locator.

27. A computer system for managing and distributing content in a plurality of observation platforms, the computer system comprising:
one or more processors;
a memory; and
instructions stored in the memory and configured to be executed by the one or more processors, the instructions for:
responsive to user interactions with a cloud based component of a content distribution manager via an interface of said content distribution manager presented on the computer system, generating a message at said cloud based component of said content distribution manager, wherein said content comprises one of audio recorded as speech and audio derived from textual language converted to spoken language;
responsive to said user interactions and to interactions of third party software via an application program interface with said cloud based component of said content distribution manager, scheduling delivery of said message and specifying a plurality of specified devices belonging to a specified class of employees for delivery in a plurality of observation platforms at a designated time and a designated location via said cloud based component of said content distribution manager, wherein said plurality of observation platforms are located in a plurality of different enterprise locations where said specified class of employees work, wherein said plurality of observation platforms are configured to receive a signal from a first mobile device with a characteristic that corresponds to an audible source, and wherein said plurality of observation platforms are further configured to relay said signal to a destination based on said characteristic;
delivering and measuring the delivery and response to said message to said plurality of observation platforms which relay said message to said plurality of specified devices at said designated time and said designated location; and
responsive to second user interactions made via a support manager application running on one of a desktop computer system, a mobile computer system, and a smartphone, performing, by the support manager application, at least one of gathering, visually representing, and reporting system performance metrics obtained by the support manager application from one or more of the plurality of observation platforms.

28. The computer system of claim 27, wherein said instructions stored in the memory further comprise instructions for:
responsive to said second user interactions, tracking, by said support manager application, technical details for one or more of devices in said observation platforms, wherein the technical details are selected from the list of technical details consisting of: a battery state, a charged state, a user volume setting, a connection point being used, a location within physical boundaries of an observation platform of the observation platforms, and environmental noise and sounds.

\* \* \* \* \*